(12) United States Patent
Shim

(10) Patent No.: US 11,206,367 B1
(45) Date of Patent: Dec. 21, 2021

(54) IMAGE SENSORS HAVING PIXELS WITH DUAL-OUTPUT CIRCUITS THEREIN

(71) Applicant: Samsung Electronics Co., Ltd., Suwon-si (KR)

(72) Inventor: Heesung Shim, Seoul (KR)

(73) Assignee: Samsung Electronics Co., Ltd.

(*) Notice: Subject to any disclaimer, the term of this patent is extended or adjusted under 35 U.S.C. 154(b) by 0 days.

(21) Appl. No.: 17/153,022

(22) Filed: Jan. 20, 2021

(30) Foreign Application Priority Data

Jun. 18, 2020 (KR) .................. 10-2020-0074099

(51) Int. Cl.
*H04N 5/355* (2011.01)
*H04N 5/378* (2011.01)
*H04N 5/353* (2011.01)

(52) U.S. Cl.
CPC ......... *H04N 5/3559* (2013.01); *H04N 5/3535* (2013.01); *H04N 5/35554* (2013.01); *H04N 5/378* (2013.01)

(58) Field of Classification Search
CPC ............... H04N 5/3559; H04N 5/3535; H04N 5/35554; H04N 5/378
See application file for complete search history.

(56) References Cited

U.S. PATENT DOCUMENTS

| 8,917,341 | B2 | 12/2014 | Sakano et al. |
| 9,654,712 | B2* | 5/2017 | Hong .................. H01L 27/1461 |
| 9,666,618 | B2* | 5/2017 | Meynants ............ H04N 5/3535 |
| 10,341,571 | B2 | 7/2019 | Mandelli et al. |
| 11,006,064 | B2* | 5/2021 | Yin .................. H01L 27/14634 |
| 2005/0145777 | A1* | 7/2005 | Barna ..................... H04N 5/378 250/208.1 |
| 2018/0063459 | A1* | 3/2018 | Stark ................. H01L 27/14612 |
| 2020/0195863 | A1 | 6/2020 | Shim et al. |
| 2020/0204751 | A1* | 6/2020 | Lule ....................... H04N 5/378 |

FOREIGN PATENT DOCUMENTS

| KR | 101619480 B1 | 5/2016 |
| KR | 20190114944 A | 10/2019 |
| KR | 20200072805 A | 6/2020 |

OTHER PUBLICATIONS

Stark et al. "A Back-Illuminated Voltage-Domain Global Shutter Pixel With Dual In-Pixel Storage" IEEE Transactions on Electron Devices 65(10):4394-4400 (Oct. 2018).

* cited by examiner

*Primary Examiner* — Amy R Hsu
(74) *Attorney, Agent, or Firm* — Myers Bigel, P.A.

(57) ABSTRACT

An image sensor pixel includes a substrate, a photodiode and a pixel circuit in the substrate. The pixel circuit includes a transfer element, which is electrically connected between the photodiode and a floating diffusion node that accumulates electrical charges generated by the photodiode in response to light incident the substrate, and a driving element, which is electrically connected to the floating diffusion node. An output circuit is also provided, which is electrically connected between a column line and the pixel circuit. The output circuit includes a switching element electrically connected to an output terminal of the driving element, a primary capacitor electrically connected to the switching element, a secondary capacitor, which is selectively connected to or disconnected from the switching element based on an on/off switching state of a first enable element, and a first selection element electrically connected between the switching element and the column line.

20 Claims, 23 Drawing Sheets

IMAGE SENSORS HAVING PIXELS WITH DUAL-OUTPUT CIRCUITS THEREIN

REFERENCE TO PRIORITY APPLICATION

This application claims the benefit under 35 USC 119(a) to Korean Patent Application No. 10-2020-0074099, filed Jun. 18, 2020, the disclosure of which is hereby incorporated herein by reference.

BACKGROUND

1. Field

The present inventive concept relates to integrated circuit devices and, more particularly, to image sensor devices.

2. Description of Related Art

Image sensors are typically semiconductor-based sensors that receive light and generate electrical signals in response to the light. These sensors may include pixel arrays having a plurality of pixels, logic circuits that drive the pixel arrays and generate image data, and the like. A logic circuit may control an image sensor using a global shutter method in which image data is obtained by simultaneously exposing a plurality of pixels to light. An image sensor operating in a global shutter mode may remove image wobble (a/k/a the "jello effect") and may capture an exact shape of a subject and output the captured subject shape as image data.

SUMMARY

Example embodiments provide an image sensor in which noise characteristics, operating speed, and the quality of a resulting image may be improved, by using capacitors in respective pixels to operate in a global shutter mode, and by varying the capacity of the capacitors as required.

According to an example embodiment, an image sensor is provided, which includes a plurality of pixels. Each of the plurality of pixels includes: (i) at least one photodiode that is configured to generate electrical charges in response to light, (ii) a pixel circuit that includes a transfer element connected between the photodiode and a floating diffusion node (in which the electrical charges are accumulated), and a driving element connected to the floating diffusion node, (iii) a first output circuit connected between a first column line and the pixel circuit, and including a first switching element connected to an output terminal of the driving element, a first primary capacitor connected to the first switching element, a first secondary capacitor connected to or disconnected from the first switching element based on an on/off switching of a first enable element, and a first selection element connected between the first switching element and the first column line, and (iv) a second output circuit connected between the pixel circuit and a second column line, different from the first column line, and including a second switching element connected to the output terminal of the driving element, a second primary capacitor connected to the second switching element, a second secondary capacitor connected to or disconnected from the second switching element based on an on/off switching of a second enable element, and a second selection element connected between the second switching element and the second column line.

According to another example embodiment, an image sensor is provided, which includes an array of pixels, and a logic circuit configured to drive the pixel array to obtain image data. Each of the plurality of pixels includes: (i) a photodiode generating electrical charges in response to light, (ii) a transfer element connected between the photodiode and a floating diffusion node, which accumulates the electrical charges, (iii) a driving element that is connected to the floating diffusion node and generates an output voltage by amplifying a voltage of the floating diffusion node, (iv) a first output circuit connected between a first column line and the driving element, and including a first switching element, a first capacitor connected to the first switching element, and a first selection element connected between the first capacitor and the first column line, and (v) a second output circuit connected between the driving element and a second column line, different from the first column line, and including a second switching element, a second capacitor connected to the second switching element, and a second selection element connected between the second capacitor and the second column line. Advantageously, the logic circuit sets the first capacitor to have a first capacity when intensity of light is a first intensity, and sets the first capacitor to have a second capacity, smaller than the first capacity, when the intensity of light is a second intensity greater than the first intensity.

According to an example embodiment, an image sensor includes a pixel array including a plurality of pixels, and a logic circuit simultaneously exposing the plurality of pixels to light for an exposure time and obtaining image data. Each of the plurality of pixels includes a photodiode, a pixel circuit connected to the photodiode and generating a reset voltage and a pixel voltage, a first output circuit including a first capacitor storing the reset voltage, and connected between a first column line and the pixel circuit, and a second output circuit including a second capacitor storing the pixel voltage, and connected between a second column line and the pixel circuit. The logic circuit adjusts a capacity of each of the first capacitor and the second capacitor, based on the exposure time.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Hereinafter, example embodiments will be described with reference to the accompanying drawings.

Figure 1:
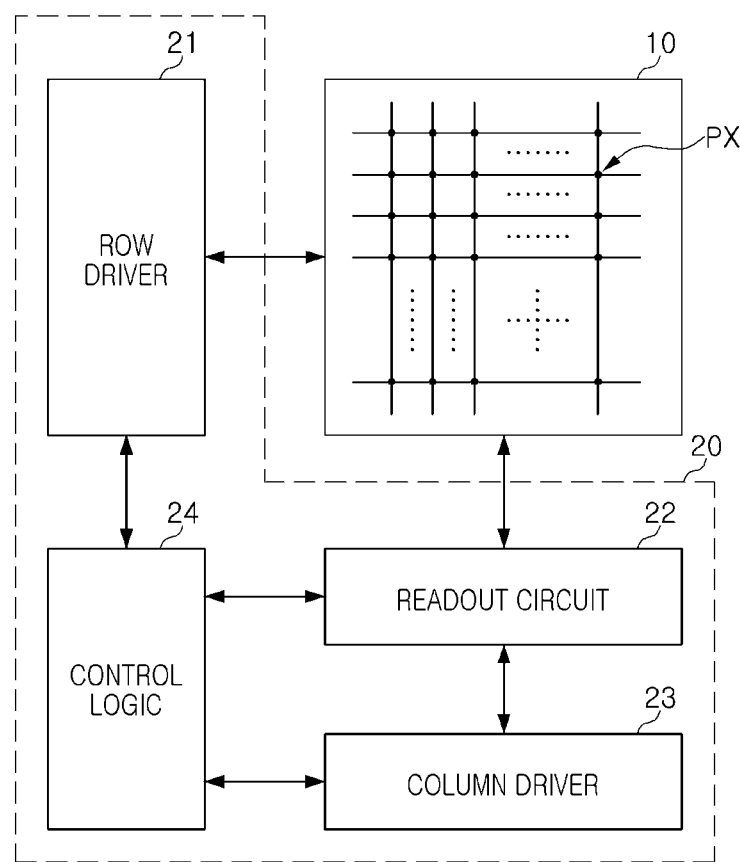
FIG. 1 is a schematic block diagram of an image sensor according to an example embodiment.

FIG. 1 is a schematic block diagram of an image sensor according to an example embodiment. Referring to FIG. 1, an image sensor 1 may include a pixel array 10, a logic circuit 20 and the like. The pixel array 10 may include a plurality of pixels PX disposed in an array shape in a plurality of rows and a plurality of columns. Each of the plurality of pixels PX may include at least one photoelectric conversion element that generates electrical charge in response to incident light, and a plurality of elements that generate a pixel signal corresponding to an electrical charge generated by the photoelectric conversion element. The photoelectric conversion element may be formed of a semiconductor material or an organic material, and may include, for example, a photodiode.

In some embodiments, each of the pixels PX may include a floating diffusion node, a transfer transistor, a reset transistor, a driving transistor, and a selection transistor. However, the configuration of the pixels PX may be changed according to example embodiments of the invention. For example, each of the pixels PX may include an organic photodiode including an organic material(s), or may be implemented as a digital pixel. When the pixels PX are implemented as digital pixels, each of the pixels PX may include an analog-to-digital converter for outputting a digital pixel signal.

The logic circuit 20 may include circuits for controlling the pixel array 10. For example, the logic circuit 20 may include a row driver 21, a readout circuit 22, a column driver 23, a control logic 24, and the like. The row driver 21 may drive the pixel array 10 in the units of row lines. For example, the row driver 21 may generate a transfer control signal for controlling transfer transistors of the respective pixels PX, and a selection control signal for controlling selection transistors, etc. to input the generated signals to the pixel array 10 in the units of row lines. In addition, the row driver 21 may simultaneously input reset control signals for controlling the reset transistors to the entire pixel array 10 to simultaneously reset the pixels PX and expose the pixels to light. In this case, the image sensor 1 may operate in a global shutter method.

The readout circuit 22 may include a correlated double sampler (CDS), an analog-to-digital converter (ADC), or the like. The correlated double samplers may be connected to the pixels PX through column lines. According to example embodiments, the pixels PX may be respectively connected to two or more analog-to-digital converters through two or more column lines. The correlated double samplers may read a pixel signal through column lines from pixels PX connected to a row line selected by a row line selection signal of the row driver 21. The analog-to-digital converter may convert the pixel signal detected by the correlated double sampler into a digital pixel signal and transmit the converted signal to the column driver 23.

The column driver 23 may include a latch capable of temporarily storing a digital pixel signal, or a buffer circuit and an amplifying circuit, and may process a digital pixel signal received from the readout circuit 22. The row driver 21, the readout circuit 22, and the column driver 23 may be controlled by the control logic 24. The control logic 24 may include a timing controller for controlling the operation timing of the row driver 21, the readout circuit 22, and the column driver 23.

Among the pixels PX, pixels PX disposed in the same position in the first direction (a traversal direction) may share column lines with each other. For example, pixels PX disposed in the same position in the second direction (a longitudinal direction) are simultaneously selected by the row driver 21 during a readout operation, and may output pixel signals through column lines. In an example embodiment, the readout circuit 22 may simultaneously obtain a pixel signal from the pixels PX selected by the row driver 21 through column lines. The pixel signal may include a reset voltage and a pixel voltage, and the pixel voltage may be a voltage in which charge generated in response to light in each of the pixels PX is reflected in the reset voltage.

When the image sensor 1 operates in a global shutter method, each of the pixels PX may include storage elements, such as capacitors, which are capable of storing the reset voltage and the pixel voltage. When the capacitors have a relatively large capacity, noise characteristics of the pixel signal may be improved, but the time required to store the reset voltage and the pixel voltage in the capacitors can increase, which means the operation speed of the image sensor 1 may be slowed. Conversely, reducing the capacity of the capacitors may improve the operation speed of the image sensor 1, but noise characteristics may deteriorate.

In an example embodiment, the capacity of capacitors included in each of the pixels PX may be adjusted, thereby advantageously implementing an operation optimized for a respective imaging environment. For example, in a high illuminance environment in which noise is not expected to be excessive, the capacity of the capacitors may be reduced to secure a fast operation speed of the image sensor 1; however, in a low illuminance environment, the capacity of the capacitors may be increased to improve the noise characteristics but at the cost of possibly slower operating speed.

Figure 2:
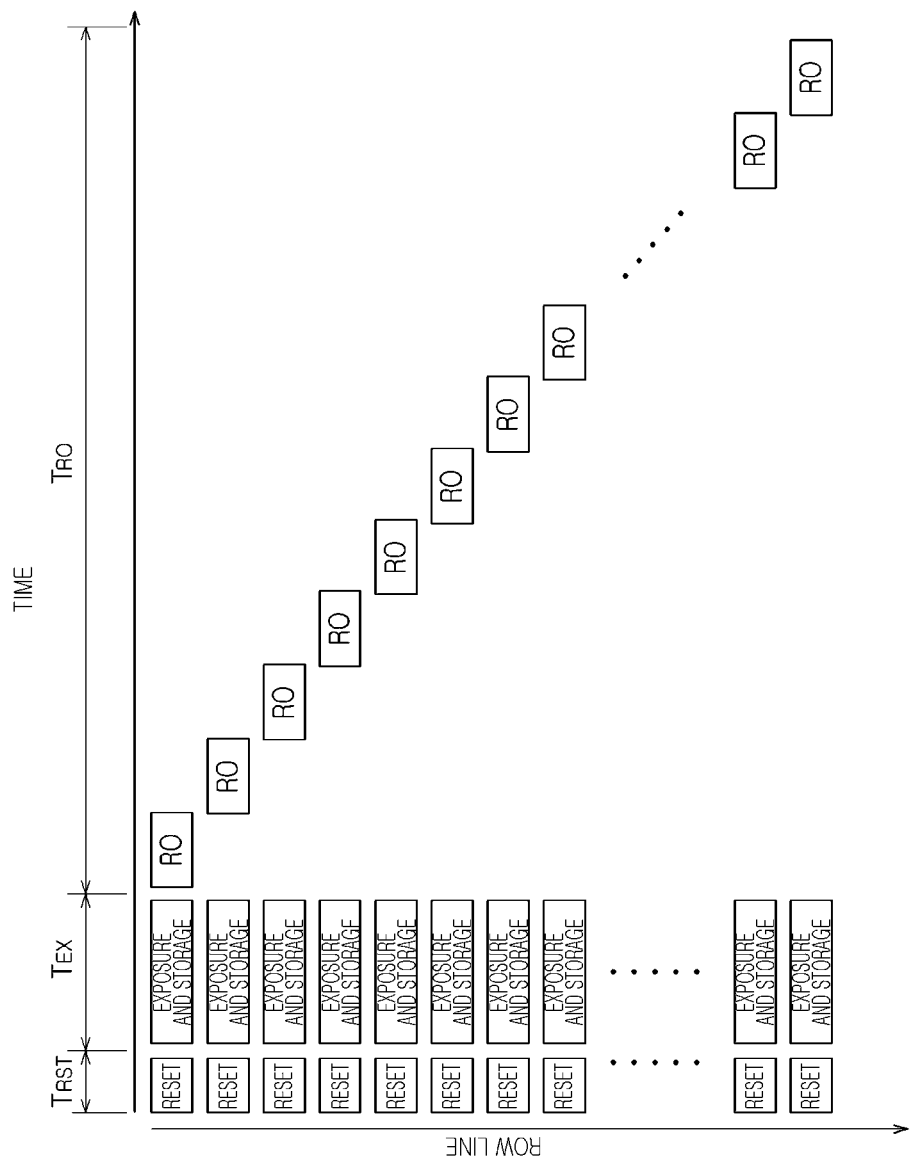
FIG. 2 is a diagram provided to illustrate the operation of an image sensor according to an example embodiment.

FIG. 2 is a diagram provided to illustrate the operation of an image sensor according to an example embodiment. FIG. 2 may be a diagram provided to illustrate a global shutter operation of the image sensor 1. Referring to FIGS. 1 and 2 together, photodiodes of a plurality of pixels PX included in the pixel array 10 may be simultaneously reset during a reset time TRST. For example, the row driver 21 may reset the photodiodes by turning on the reset elements included in the pixels PX to remove electrical charges from the photodiodes.

When the photodiodes are reset, the photodiodes included in the plurality of pixels PX may be exposed to light during the exposure time $T_{EX}$ to generate an electrical charge. For example, the exposure time $T_{EX}$ may be determined by an operating environment of the image sensor 1, a shutter speed, an aperture value, and the like.

The electric charges generated by the photodiodes in response to light during the exposure time $T_{EX}$ may be stored in capacitors included in the pixels PX. Accordingly, the exposure time $T_{EX}$ may include a time at which the photodiodes are exposed to light and a time at which the electrical charge generated by the photodiodes is stored in the capacitors. For example, a reset voltage in which charges generated by photodiodes are not reflected may be stored in a first capacitor, and a pixel voltage in which charges generated by photodiodes are reflected in the reset voltage may be stored in a second capacitor different from the first capacitor.

When the exposure time $T_{EX}$ elapses, the row driver 21 may scan the plurality of respective row lines. The readout circuit 22 may perform a readout operation for the plurality of respective pixels PX according to an order in which the row driver 21 scans the plurality of row lines. The readout circuit 22 may read the reset voltage and the pixel voltage stored in the plurality of respective pixels PX during a readout time TRO.

Figure 3:
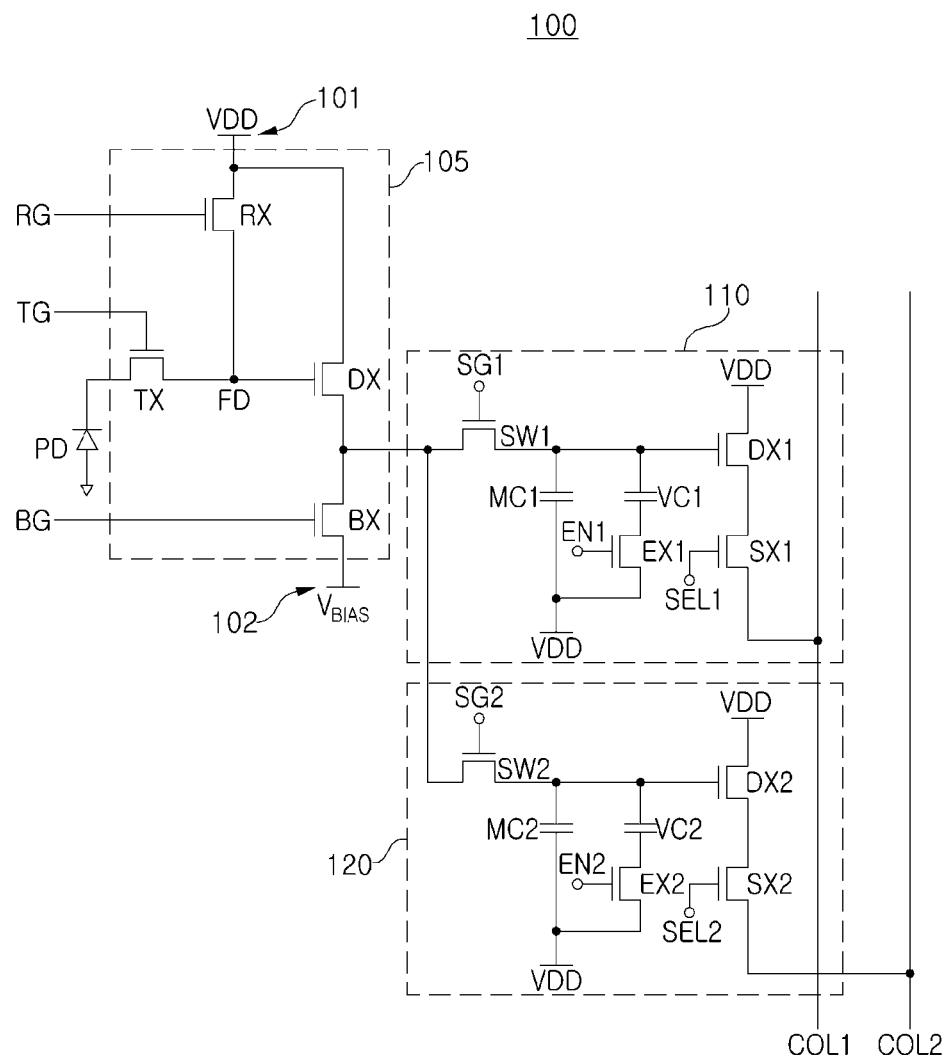
FIG. 3 is a schematic circuit diagram of a pixel included in an image sensor according to an example embodiment.

FIG. 3 is a schematic circuit diagram of a pixel included in an image sensor according to an example embodiment. Referring to FIG. 3, in an image sensor according to an example embodiment, a pixel 100 may include a pixel circuit 105 connected to a photodiode PD, a first output circuit 110 connected to the pixel circuit 105, a second output circuit 120 connected to the pixel circuit 105, and the like. The first output circuit 110 and the second output circuit 120 may be connected to the pixel circuit 105 in parallel.

The pixel circuit 105 may include a floating diffusion node FD, a transfer element TX, a reset element RX, a driving element DX, a bias element BX, and the like. The floating diffusion node FD may be a node in which charges generated by the photodiode PD are accumulated, and the transfer element TX may be connected between the floating diffusion node FD and the photodiode PD. When the transfer element TX is turned on by a transfer control signal TG, electrical charges generated by the photodiode PD may move and may be accumulate in the floating diffusion node FD.

The reset element RX may be connected between a power node 101 supplying a power voltage VDD and the floating diffusion node FD. When the reset element RX is turned on by a reset control signal RG, the electrical charge of the floating diffusion node FD is removed and the voltage of the floating diffusion node FD may be reset.

The driving element DX includes a gate electrode connected to the floating diffusion node FD, and may operate as a source-follower amplifier. The driving element DX may amplify and output the voltage of the floating diffusion node FD, and the first output circuit 110 and the second output circuit 120 may be connected to an output terminal of the driving element DX. Further, the driving element DX is connected to the bias element BX that supplies a bias voltage $V_{BIAS}$, and may receive a current required for operation through the bias element BX. The bias element BX may be turned on while the driving element DX is operated by the bias control signal BG.

The first output circuit 110 may be connected between the pixel circuit 105 and a first column line COL1. The first output circuit 110 may include a first switching element SW1, a first primary capacitor MC1, a first secondary capacitor VC1, a first selection element SX1, a first output driving element DX1 and the like. The first secondary capacitor VC1 may be connected to a first enable element EX1 in series, and the first secondary capacitor VC1 and the first enable element EX1 may be connected to the first primary capacitor MC1 in parallel.

The first primary capacitor MC1, the first enable element EX1, and the first secondary capacitor VC1 may provide a first capacitor of the first output circuit 110. When the first enable element EX1 is turned off, only the first primary capacitor MC1 is connected to the first switching element SW1, and when the first enable element EX1 is turned on, the first primary capacitor MC1 and the first secondary capacitor VC1 may be connected to the first switching element SW1 together. Accordingly, the capacity of the first capacitor may change based on the on/off switching of the first enable element EX1.

The first output driving element DX1 receives the power voltage VDD, and a gate of the first output driving element DX1 may be connected to the first switching element SW1. Accordingly, the first output driving element DX1 may operate as a source-follower amplifier based on the voltage stored in the first primary capacitor MC1 (or the first primary capacitor MC1 and the first secondary capacitor VC1). The first selection element SX1, which is connected between the first column line COL1 and the first output driving element DX1, may be controlled by a first selection signal SEL1.

The second output circuit 120 may be connected between the pixel circuit 105 and a second column line COL2. The second output circuit 120 may include a second switching element SW2, a second primary capacitor MC2, a second secondary capacitor VC2, a second selection element SX2, a second output driving element DX2, and the like. The configuration and operation of the second output circuit 120 may be similar to those of the first output circuit 110. For example, the second primary capacitor MC1, a second enable element EX2, and the second secondary capacitor VC2 may provide a second capacitor of the second output circuit 120, and the capacity of the second capacitor may be change based on the On/Off switching of the second enable element EX2.

In an example embodiment, the first output circuit 110 may sample the reset voltage output from the pixel circuit 105, and the second output circuit 120 may sample the pixel voltage output from the pixel circuit 105. For example, the first switching element SW1 may be turned on before the floating diffusion node FD is reset and the transfer element TX is turned on, and the reset voltage may be sampled to the first capacitor. The second switching element SW2 is turned on after the transfer element TX is turned on and the charge of the photodiode PD moves to the floating diffusion node FD, and the pixel voltage may be sampled to the second capacitor.

The first and second output circuits 110 and 120 may simultaneously output the reset voltage and the pixel voltage. In detail, while the first output circuit 110 outputs the reset voltage to the first column line COL1, the second output circuit 120 may output the pixel voltage to the second column line COL2. For example, the first column line COL1 may be connected to a first analog-to-digital converter, and the second column line COL2 may be connected to a second analog-to-digital converter. The logic circuit of the image sensor may calculate a difference between a first digital signal output from the first analog-to-digital converter and a second digital signal output from the second analog-to-digital converter to obtain image data of the pixel 100.

The first primary capacitor MC1 may have a smaller capacity than the first secondary capacitor VC1. Similarly, the second primary capacitor MC2 may have a smaller capacity than the second secondary capacitor VC2. According to example embodiments, capacities of the first primary capacitor MC1 and the second primary capacitor MC2 may be the same or different from each other. Similarly, capacities of the first secondary capacitor VC1 and the second secondary capacitor VC2 may be the same or different from each other.

Referring to the first output circuit 110 as an example, when the first enable element EX1 is turned off, only the first primary capacitor MC1 may be connected to the first switching element SW1. Accordingly, the capacity of the first output circuit 110 for sampling the reset voltage output from the driving element DX is reduced, and the sampling time may be shortened, while noise based on the on/off switching operation of the first switching element SW1, or the like, may increase. Conversely, when the first enable element EX1 is turned on, the capacity of the first output circuit 110 increases by the first secondary capacitor VC1, so that the sampling time increases, but noise based on the on/off switching operation of the first switching element SW1 may be advantageously removed. The operation of the second output circuit 120 may also be similarly understood.

The logic circuit of the image sensor may determine the capacity of each of the first capacitor and the second capacitor in consideration of at least one of various parameters such as light intensity, exposure time, and sensitivity. For example, when the light intensity is a first intensity, the first capacitor may be set to have a first capacity, and when the light intensity is a second intensity greater than the first intensity, the first capacitor may be set to have a second capacity, lower than the first capacity. Similarly, when the light intensity is the first intensity, the second capacitor may be set to have a third capacity, and when the light intensity is the second intensity, the second capacitor may be set to have a fourth capacity lower than the third capacity. The first to fourth capacities may be respectively determined based on respective capacities of the first primary capacitor MC1, the first secondary capacitor VC1, the second primary capacitor MC2, and the second secondary capacitor VC2. As an example, when the first and second primary capacitors MC1 and MC2 have the same capacities and the first and second secondary capacitors VC1 and VC2 have the same capacities, the first and third capacities may be the same, and the second and fourth capacities may be the same.

As another example, the logic circuit may compare the exposure time with a predetermined reference time to set capacities of each of the first capacitor and the second capacitor. For example, when the exposure time is longer than the reference time, the capacities of the first capacitor and the second capacitor may be set to be relatively large, and when the exposure time is shorter than the reference time, the capacities of the first capacitor and the second capacitor may be set relatively small. Alternatively, the capacities of the first capacitor and the second capacitor may be determined according to an ISO value representing the sensitivity. In an example embodiment, when the ISO value is less than a predetermined reference value, the capacities of the first capacitor and the second capacitor may be reduced, and when the ISO value is greater than the reference value, the capacities of the first capacitor and the second capacitor may be increased. However, this is only an example embodiment, and the capacity of the first capacitor and the second capacitor may also be determined by the logic circuit in consideration of other various parameters.

Figure 4:
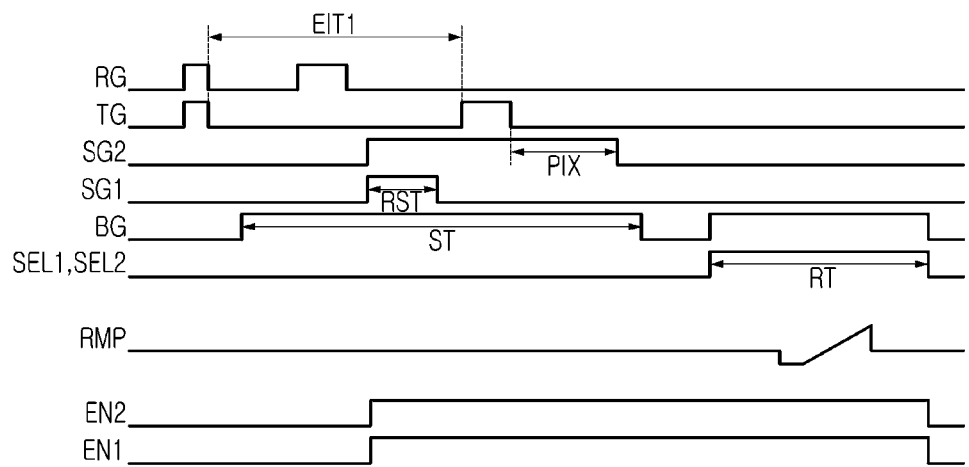
FIGS. 4 to 6 are diagrams provided to illustrate the operation of an image sensor according to example embodiments.
Figure 5:
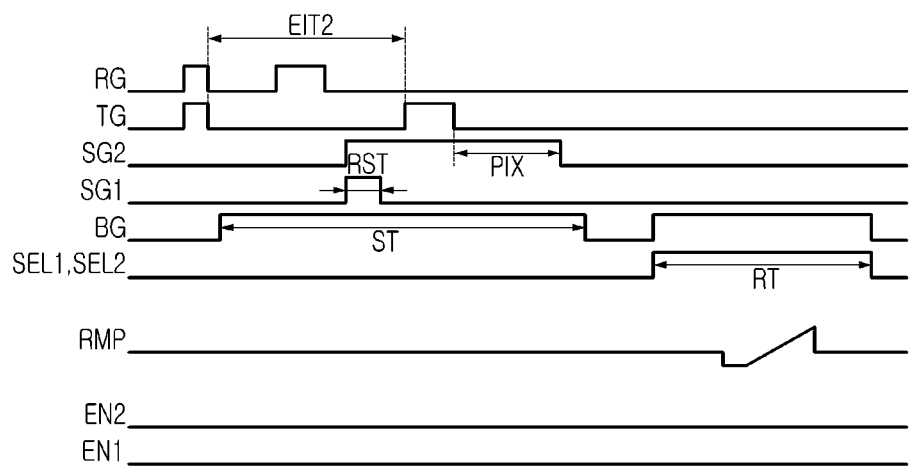
Figure 6:
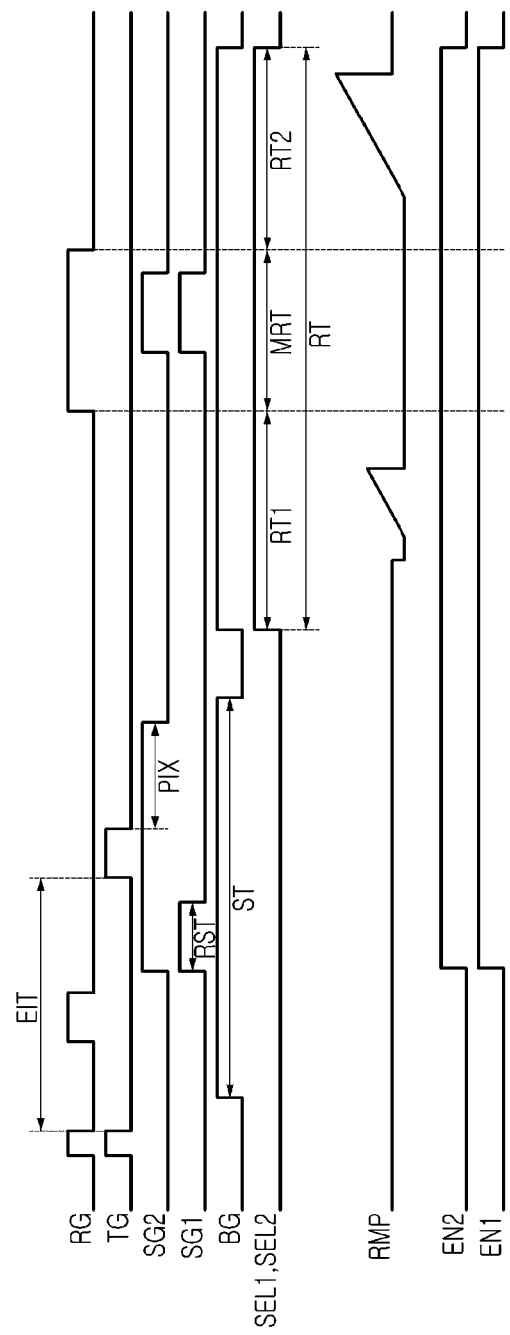

FIGS. 4 to 6 are diagrams provided to illustrate the operation of image sensors according to example embodiments. Hereinafter, for convenience of description, the operation of the image sensor will be described with reference to the sensor 100 of FIG. 3. First, referring to FIG. 4, the reset element RX and the transfer element TX are turned on by the reset control signal RG and the transfer control signal TG, and thus, the floating diffusion node FD and the photodiode PD may be reset. When the reset element RX and the transfer element TX are turned off, a first exposure time EIT1 starts, and during the first exposure time EIT1, the photodiode reacts to light to generate electrical charges. During the first exposure time EIT1, the transfer element TX maintains a turned-off state, and the reset element RX is turned on at least one time or more to reset the voltage of the floating diffusion node FD again. When the reset element RX is turned off, the first switching element SW1 is turned on by a first switch control signal SG1 to store the reset voltage in the first output circuit 110. When the first exposure time EIT1 starts, the bias element BX may be turned on by a bias control signal BG so that the driving element DX of the pixel circuit 105 may operate. The bias element BX may be turned on during a storage time ST for storing the reset voltage and the pixel voltage.

The time at which the first switching element SW1 is turned on may be defined as a reset sampling time RST. In the example embodiment illustrated in FIG. 4, together with the first switching element SW1, the first enable element EX1 may also be turned on. Accordingly, the reset voltage may be stored in the first primary capacitor MC1 and the first secondary capacitor VC1.

Referring to FIG. 4, the first switching element SW1 and the second switching element SW2 may be turned on together. Accordingly, the reset voltage may also be stored in the second output circuit 120. Since the second enable element EX2 is turned on together with the second switching element SW2, the reset voltage may be stored in the second primary capacitor MC2 and the second secondary capacitor VC2.

When the first exposure time EIT1 ends, the transfer element TX is turned on by the transfer control signal TG, and the electrical charge generated by the photodiode PD during the first exposure time EIT1 may move to the floating diffusion node FD. When electrons are the main charge carriers, the voltage of the floating diffusion node FD may decrease from the reset voltage. The first switching element SW1 may be turned off before the transfer element TX is turned on, for example, before the first exposure time EIT1 ends. Accordingly, before the electrical charge of the photodiode PD moves to the floating diffusion node FD, the first output circuit 110 may be separated from the pixel circuit 105.

On the other hand, the second switching element SW2 may maintain the turned-on state even while the first exposure time EIT1 ends and the transfer element TX is turned on so that the electrical charge of the photodiode PD moves to the floating diffusion node FD. When the transfer element TX is turned off, the pixel voltage determined by electrical charges transferred from the photodiode PD may be stored in the second output circuit 120 during a pixel sampling time PIX. For example, in the second output circuit 120, the voltages of the second primary capacitor MC2 and the second secondary capacitor VC2 may be reduced by electrical charges accumulated in the floating diffusion node FD.

And, when the pixel sampling time PIX elapses, the bias element BX may be turned off. Thereafter, a readout operation may be performed during a readout time RT at which the first selection element SEL1 and a second selection element SEL2 are turned on. The readout operation may include comparing each of the reset voltage stored in the first output circuit 110 and the pixel voltage stored in the second output circuit 120 with a ramp voltage RMP, and converting the comparison result into a digital signal by the analog-to-digital converter. For example, a first sampler connected to the first column line COL1 may compare the reset voltage and the ramp voltage RMP and may output the comparison result to the first analog-to-digital converter. Also, a second sampler connected to the second column line COL2 may compare the pixel voltage and the ramp voltage RMP and output the comparison result to the second analog-to-digital converter. Accordingly, the readout operations for the first output circuit 110 and the second output circuit 120 may be simultaneously performed. During the read-out time RT, the bias element BX is turned on to supply a bias current required for a read-out operation.

In the example embodiment illustrated in FIG. 4, the reset voltage may be stored in the first primary capacitor MC1 and the first secondary capacitor VC1 during the storage time ST, and the pixel voltage may be stored in the second primary capacitor MC2 and the second secondary capacitor VC2 during the storage time ST. Accordingly, until the readout operation is terminated, the first enable element EX1 and the second enable element EX2 may maintain a turned-on state.

On the other hand, unlike the example embodiment illustrated in FIG. 4, during the storage time ST, the second switching element SW2 may be turned on at a timing different from that of the first switching element SW1. As an example, the second switching element SW2 may be turned on after the transfer element TX is turned on and the electrical charge of the photodiode PD moves to the floating diffusion node FD.

Next, referring to FIG. 5, the photodiode PD may be exposed to light during a second exposure time EIT2 shorter than the first exposure time EIT1 to generate electrical charges. In an example embodiment, the example embodiment described with reference to FIG. 4 may be an example embodiment for describing the operation of the image sensor in a low-illuminance environment, for example, an imaging environment in which the intensity of light is relatively weak. On the other hand, the example embodiment described with reference to FIG. 5 may be an example embodiment for describing the operation of the image sensor in a high-illuminance environment, for example, an imaging environment in which the intensity of light is relatively strong.

In an imaging environment in which the intensity of light is strong, more charges may be generated in the photodiode PD than in an imaging environment in which the intensity of light is weak. Accordingly, as illustrated in FIG. 5, the second exposure time EIT2 may be set to be shorter than the first exposure time EIT1. As the second exposure time EIT2 is set to be relatively short, the reset sampling time RST at which the first output circuit 110 samples the reset voltage may be reduced compared to the example embodiment illustrated in FIG. 4. According to example embodiments, the pixel sampling time PIX at which the second output circuit 120 samples the pixel voltage may also be reduced compared to the example embodiment illustrated in FIG. 4. Accordingly, in the example embodiment illustrated in FIG. 5, the storage time ST may be reduced compared to the example embodiment illustrated in FIG. 4.

Referring to FIG. 5, during the storage time ST and the readout time RT, the first enable element EX1 and the second enable element EX2 may maintain a turned-off state. The example embodiment illustrated in FIG. 5 may be a high-illuminance environment in which the intensity of light is relatively strong, and in this case, compared to the example embodiment illustrated in FIG. 4, the signal intensity may be increased and noise may be weakened. Accordingly, by turning off the first enable element EX1 in the first output circuit 110 and connecting only the first primary capacitor MC1 to the first switching element SW1, the settling time required to sample the reset voltage to the first primary capacitor MC1 may be reduced, and the operation speed of the image sensor may be improved. Similarly, in the second output circuit 120 as well, only the second primary capacitor MC2 is connected to the second switching element SW2 to shorten the settling time.

Next, referring to FIG. 6, two readout operations may be performed at a first readout time RT1 and a second readout time RT2. In an example embodiment illustrated in FIG. 6, the operation of the pixel 100 during the exposure time EIT and the storage time ST may be similar to the example embodiments described above with reference to FIGS. 4 and 5. During the first readout time RT1, the logic circuit of the image sensor may read the reset voltage from the first output circuit 110 through the first column line COL1, and may read the pixel voltage from the second output circuit 120 through the second column line COL2.

Since the first output circuit 110 includes the first output driving element DX1 and the second output circuit 120 includes the second output driving element DX2, an offset component due to a difference between the first output driving element DX1 and the second output driving element DX2 may be included between the voltage output from the first output circuit 110 and the voltage output from the second output circuit 120. For example, the offset component may occur due to a difference in threshold voltages between the first output driving element DX1 and the second output driving element DX2. In the example embodiment illustrated in FIG. 6, the offset component may be removed by executing the first readout operation during the first readout time RT1 and the second readout operation during the second readout time RT2.

During the first readout time RT1, the logic circuit of the image sensor may obtain the reset voltage and the pixel voltage. During the intermediate reset time MRT after the first readout time RT1, the reset element RX, the first switching element SW1, and the second switching element SW2 are turned on, and a predetermined reference voltage may be commonly input to the first output circuit 110 and the second output circuit 120. The first output driving element DX1 and the second output driving element DX2 may operate as a source-follower amplifier by a reference voltage. Thereafter, the reset element RX, the first switching element SW1, and the second switching element SW2 are turned off, and the logic circuit may read the reference voltage from the first and second output circuits 110 and 120 through the first column line COL1 and the second column line COL2.

An offset component due to a difference in threshold voltages between the first output driving element DX1 and the second output driving element DX2 may occur in both the first readout operation and the second readout operation. When the reset voltage, pixel voltage, reference voltage, and offset component are considered, the first analog-to-digital converter connected to the first column line COL1 sequentially outputs the reset voltage and the reference voltage, and the second analog-to-digital converter connected to the second column line COL2 may sequentially output (pixel voltage+offset component) and (reference voltage+offset component). The above example may be an example embodiment in which an offset component based on a difference between the first output driving element DX1 and the second output driving element DX2 is reflected in the second output driving element DX2.

For example, a first raw image signal obtained by calculating the difference between the output of the first analog-to-digital converter and the output of the second analog-to-digital converter during the first readout time RT1 may be calculated as the (reset voltage-pixel voltage-offset component). On the other hand, a second raw image signal obtained by calculating the difference between the output of the first analog-digital converter and the output of the second analog-digital converter during the second read-out time RT2 may be calculated as the (reference voltage-reference voltage-offset component). Therefore, by calculating the difference between the first raw image signal and the second raw image signal, the offset component may be removed and image data corresponding to (reset voltage-pixel voltage) may be accurately obtained.

In the example embodiment illustrated in FIG. 6, the first enable element EX1 and the second enable element EX2 may maintain a turned-on state during the storage time ST and the read-out time RT. However, according to example embodiments, for example, in an example embodiment in which the exposure time EIT decreases due to an increase in light intensity in an imaging environment, the first enable element EX1 and the second enable element EX2 may also be maintained in the turned-off state.

Figure 7:
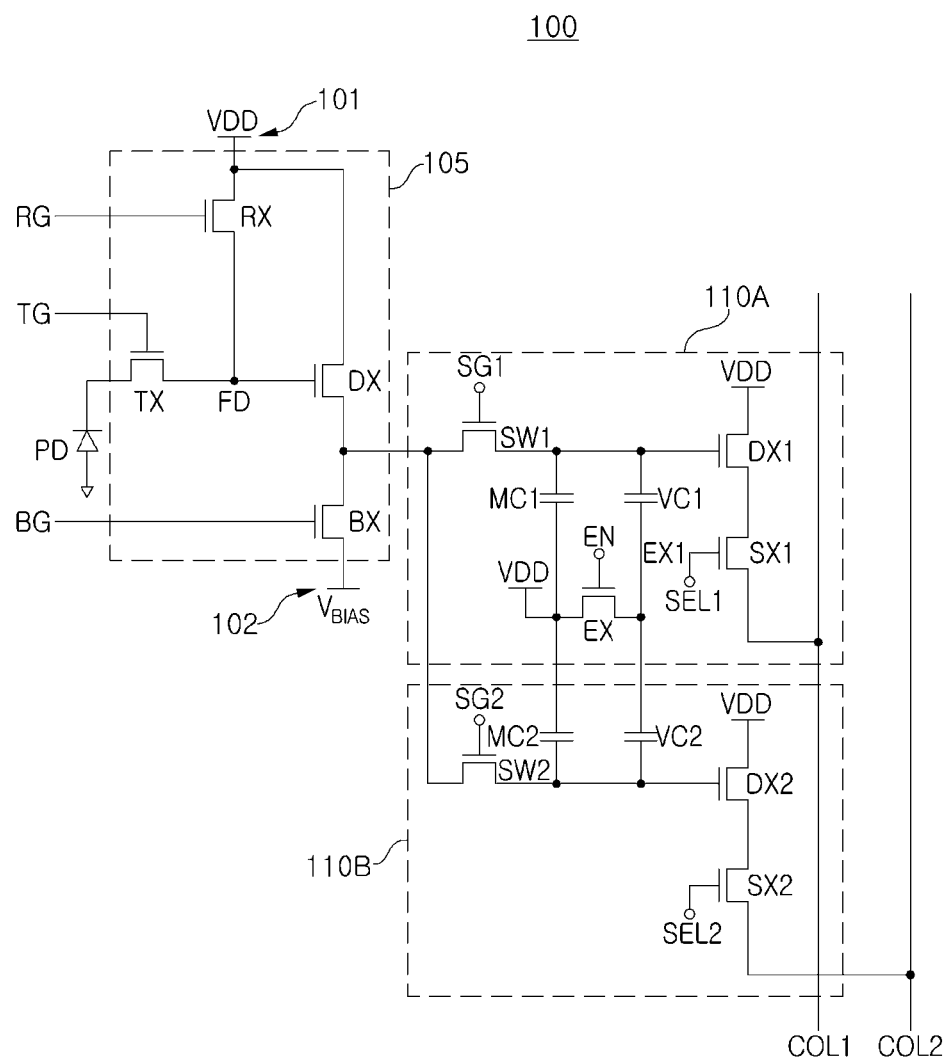
FIG. 7 is a schematic circuit diagram of a pixel included in an image sensor according to an example embodiment.

FIG. 7 is a schematic circuit diagram of a pixel included in an image sensor according to an example embodiment. In the pixel 100 according to an example embodiment illustrated in FIG. 7, the pixel circuit 105 may be the same as that in the example embodiment described above with reference to FIG. 3. Unlike the example embodiment illustrated in FIG. 3, in the example embodiment illustrated in FIG. 7, the first output circuit 110 and the second output circuit 120 may share one enable element EX. The enable element EX is controlled by an enable signal EN, and may be connected to the power node 101 supplying the power voltage VDD, as shown.

When the enable element EX is turned off, only the first primary capacitor MC1 and the second primary capacitor MC2 are connected to the pixel circuit 105, and the first secondary capacitor VC1 and the second secondary capacitor VC2 may be separated from the pixel circuit 105. As described above, when a relatively long exposure time is required, the enable element EX may be turned on, for example, in a low-illuminance imaging environment in which the intensity of light is weak. When a relatively short exposure time is required, the enable element EX may be turned off, for example, in a high-illuminance imaging environment in which the intensity of light is strong.

Figure 8:
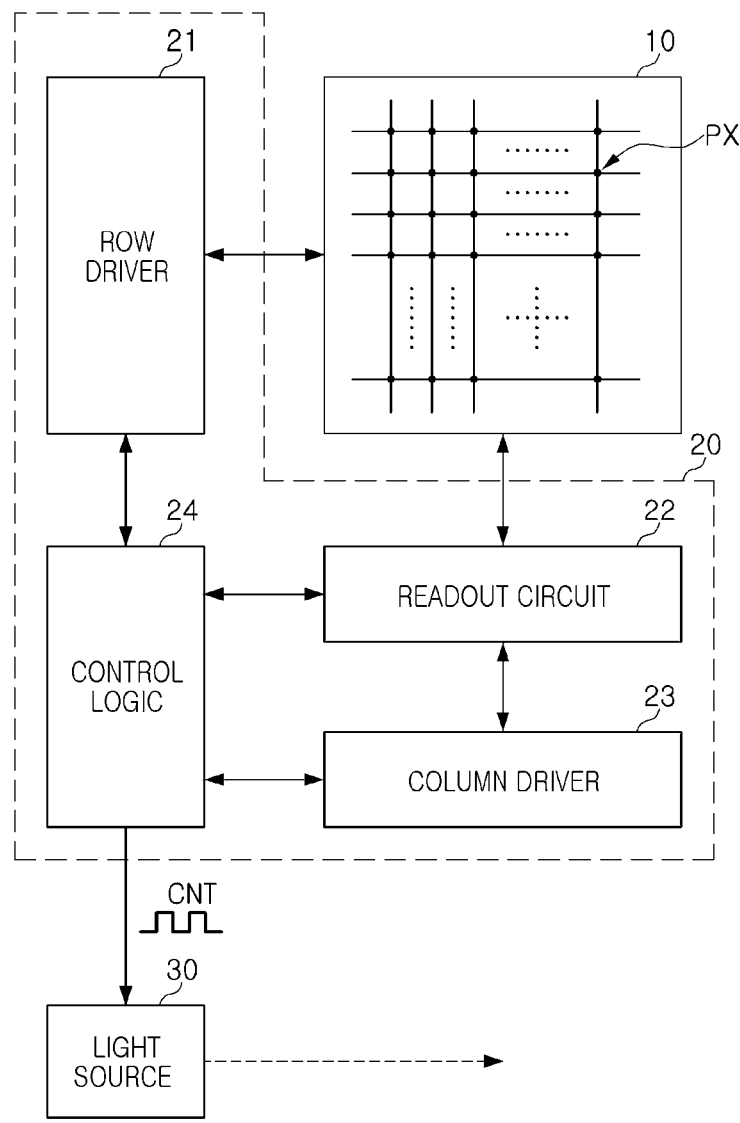
FIG. 8 is a schematic block diagram of an image sensor according to an example embodiment.

FIG. 8 is a schematic block diagram of an image sensor according to an example embodiment. In an example embodiment illustrated in FIG. 8, an image sensor 1A may include a pixel array 10, a logic circuit 20, a light source 30, and the like. The configuration and operation of the pixel array 10 may be similar to that described with reference to FIG. 1.

The light source 30 may operate by a control signal CNT output from the control logic 24. For example, the control signal CNT may be a square wave signal, and the light source 30 may output light in an infrared wavelength band. While the light source 30 outputs light by the control signal CNT, the logic circuit 20 may expose the pixels PX to light. Light output from the light source 30 and reflected by a subject may be incident on the pixels PX, and photodiodes may react to the light to generate electrical charge.

The image sensor 1A according to the example embodiment illustrated in FIG. 8 may be applied to various fields such as a camera device for face recognition, an autonomous vehicle, and driver monitoring of a vehicle. In addition, the logic circuit 20 may obtain a first digital pixel signal from a first pixel voltage corresponding to electrical charges generated by the photodiodes while the light source 30 is operating, and may obtain a second digital pixel signal from a second pixel voltage corresponding to electrical charges generated by the photodiodes while the light source 30 is not operating. The logic circuit 20 may generate image data by calculating a difference between the first digital pixel signal and the second digital pixel signal, and may remove effects of ambient light other than the light output from the light source 30.

Figure 9:
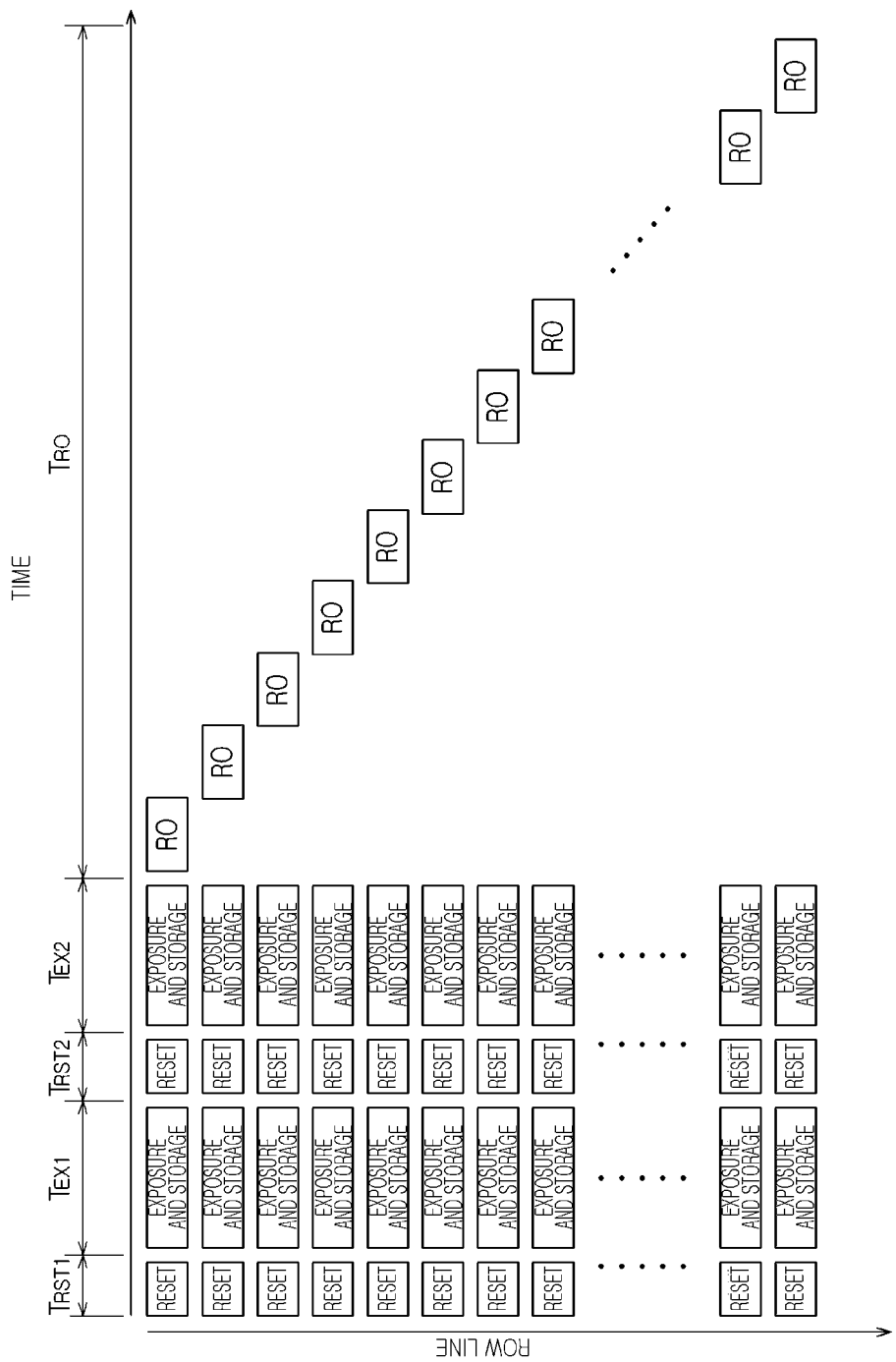
FIG. 9 is a diagram provided to illustrate the operation of an image sensor according to an example embodiment.

FIG. 9 is a diagram provided to describe the operation of the image sensor according to an example embodiment. FIG. 9 may be a diagram provided to illustrate the operation of the image sensor 1A including the light source 30. Referring to FIGS. 8 and 9 together, photodiodes of the plurality of pixels PX included in the pixel array 10 may be simultaneously reset during a first reset time TRST1. For example, the row driver 21 may reset the photodiodes by turning on the reset elements included in the pixels PX to remove electrical charges from the photodiodes.

When the photodiodes are reset, the photodiodes included in the plurality of pixels PX may be exposed to light during a first exposure time $T_{EX1}$ to generate electrical charge. During the first exposure time $T_{EX1}$, the control logic 24 may operate the light source 30 by outputting the control signal CNT to the light source 30. During the first exposure time $T_{EX1}$, the photodiodes may generate electrical charges in response to light output from the light source 30 and reflected from the subject and ambient light other than light output from the light source 30.

A first pixel voltage corresponding to the electrical charge generated by the photodiodes during the first exposure time $T_{EX1}$ may be sampled by a first output circuit included in each of the pixels PX. The first exposure time $T_{EX1}$ may include a time at which the photodiodes are exposed to light, and a time at which the first output circuit of each of the pixels PX samples the first pixel voltage corresponding to the electrical charge generated by the photodiodes.

During a second reset time TRST2 after the first exposure time $T_{EX1}$, the logic circuit 20 may reset the pixels PX included in the pixel array 10 again. When the pixels PX are reset to remove electrical charges from the photodiodes, the logic circuit 20 may expose the pixels to light again during the second exposure time $T_{EX2}$. During the second exposure time $T_{EX2}$, the light source 30 may not operate. Accordingly, during the second exposure time $T_{EX2}$, the photodiodes may generate electrical charges in response to ambient light. The second pixel voltage corresponding to the electrical charge generated by the photodiodes during the second exposure time $T_{EX2}$ may be sampled by the second output circuit included in each of the pixels PX.

During the readout time TRO, the row driver 21 may scan the plurality of respective row lines. The readout circuit 22 may perform a readout operation for each of the pixels PX according to an order in which the row driver 21 scans a plurality of row lines. The readout circuit 22 may obtain a first digital pixel signal and a second digital pixel signal by comparing the first pixel voltage and the second pixel voltage stored in each of the pixels PX with the ramp voltage during the readout time TRO.

Figure 10:
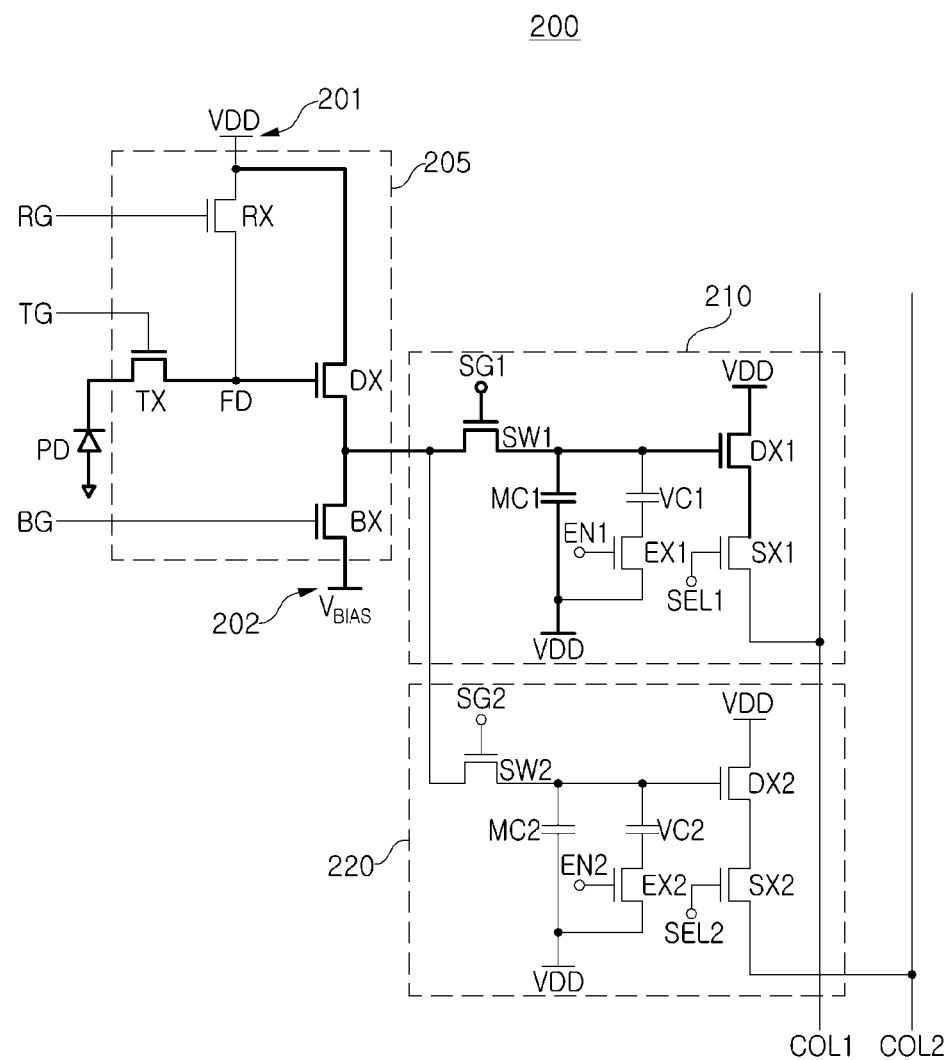
FIGS. 10 to 12 are views provided to illustrate the operation of an image sensor according to an example embodiment.
Figure 11:
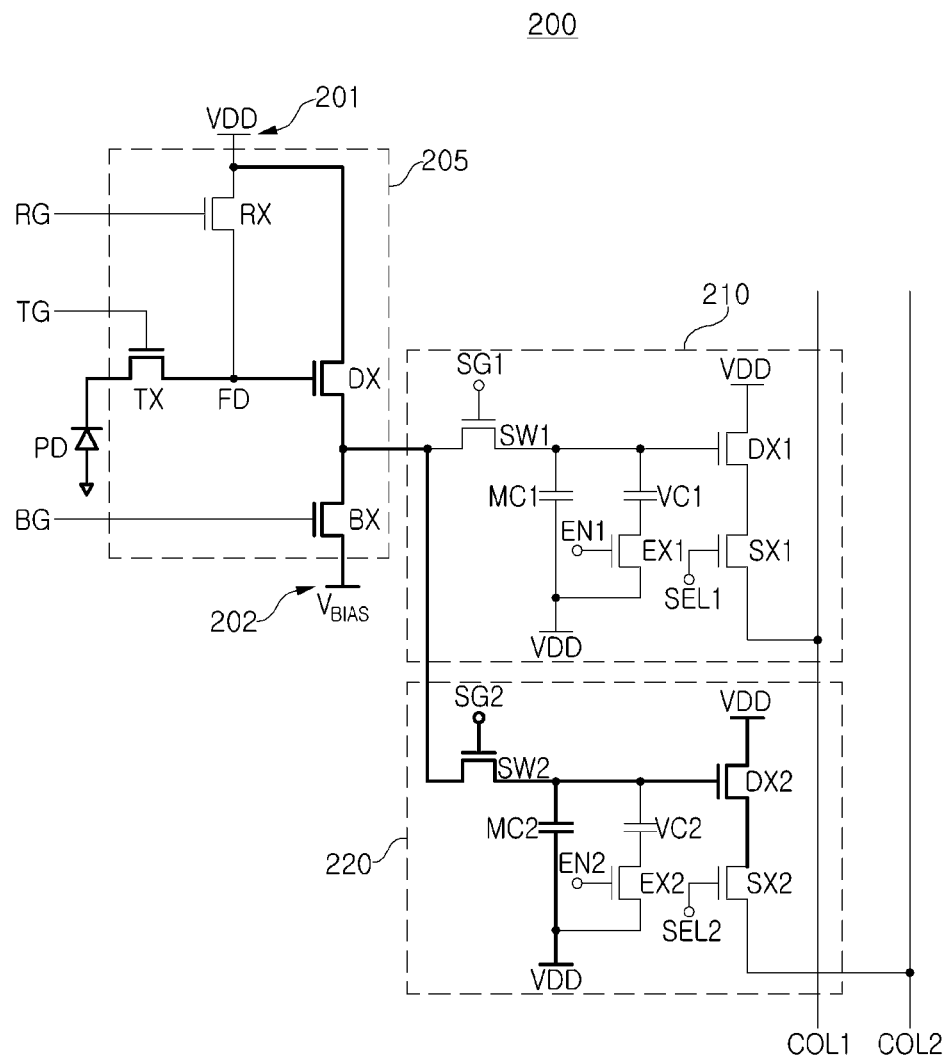
Figure 12:
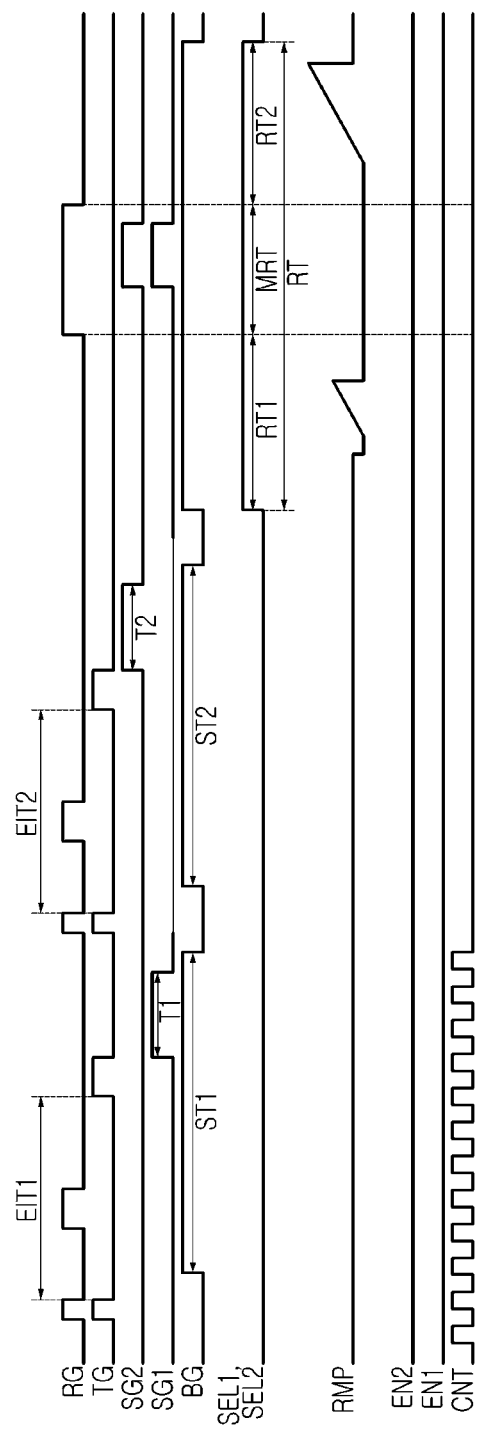

FIGS. 10 to 12 are views provided to illustrate the operation of an image sensor according to an example embodiment. Referring to FIGS. 10 and 11, a pixel 200 of the image sensor may include a photodiode PD, a pixel circuit 205, a first output circuit 210, a second output circuit 220, and the like. The configuration and operation of the pixel circuit 205, the first output circuit 210, and the second output circuit 220 may be similar to those described above with reference to FIG. 3.

FIG. 10 may be a diagram for describing the operation of the pixel 200 while the light source included in the image sensor is operating, and FIG. 11 is a diagram illustrating the operation of the pixel 200 while the light source included in the image sensor is not operating. Hereinafter, the operation of the pixel 200 will be described with reference to FIGS. 10, 11 and 12 together.

Referring to FIG. 12, in the operation of the pixel 200, first, the reset element RX and the transfer element TX may be turned on by the reset control signal RG and the transfer control signal TG, and electrical charges of the photodiode PD and the floating diffusion node FD may be removed. When the electrical charge of the photodiode PD and the floating diffusion node FD is removed and the reset operation is completed, the first exposure time EIT1 may start. During the first exposure time EIT1, the photodiode PD is exposed to light to generate electrical charge, and when the first exposure time EIT1 elapses, the transfer element TX is turned on, and electrical charges of the photodiode PD may move to the floating diffusion node FD.

When the transfer element TX is turned off, the first switching element SW1 is turned on by the first switch control signal SG1 for a first sampling time T1, and the first output circuit 210 may sample the first pixel voltage output from the driving element DX as illustrated in FIG. 10. The first pixel voltage may be a voltage corresponding to electrical charge generated by the photodiode PD during the first exposure time EIT1. On the other hand, while the first output circuit 210 samples the first pixel voltage, the bias element BX is turned on to supply a bias current required for the operation of the driving element DX. As an example, the bias element BX may be turned on for a first storage time ST1 that is longer than the first sampling time T1.

Referring to FIG. 12, the light source may be operated by the control signal CNT during the first exposure time EIT1. Accordingly, the first pixel voltage sampled by the first output circuit during the first sampling time T1 may be a voltage corresponding to electrical charge generated by the photodiode PD by light output from the light source and ambient light. Although the example embodiment in FIG. 12 illustrates that the light source may be turned on even during the first storage time ST1 and the first sampling time T1, unlike this, the light source may only be turned on during the first exposure time EIT1.

When the first sampling time T1 and the first storage time ST1 are terminated, the reset element RX and the transfer element TX are turned on again, and the floating diffusion node FD and the photodiode PD are may be reset. The photodiode PD may be exposed to light during the second exposure time EIT2 after the reset operation to generate electrical charge. Since the light source does not operate during the second exposure time EIT2, the photodiode PD may generate electrical charge only by ambient light during the second exposure time EIT2 without the influence of the light source.

When the second exposure time EIT2 elapses, the transfer element TX is turned on, the electrical charge of the photodiode PD moves to the floating diffusion node FD, and the driving element DX may operate as a source-follower amplifier by the turned-on bias element BX. Also, during the second sampling time T2, the second switching element SW2 may be turned on, and the second output circuit 220 may sample the second pixel voltage as illustrated in FIG. 11. The second pixel voltage may be a voltage corresponding to electrical charge generated by the photodiode PD only by ambient light without an influence of a light source.

When the second sampling time T2 and the second storage time ST2 elapse, the first pixel voltage and the second pixel voltage may be read during the first readout time RT1. During the first read-out time RT1, the read-out circuit of the image sensor may compare the first pixel voltage output through the first column line COL1 with the ramp voltage RMP to obtain a first digital pixel signal. In addition, the readout circuit may obtain a second digital pixel signal by comparing the second pixel voltage output through the second column line COL2 with the ramp voltage RMP during the first readout time RT1.

When the first readout time RT1 elapses, the reset element RX is turned on to reset the floating diffusion node FD. In this case, the first switching element SW1 and the second switching element SW2 together with the reset element RX are turned on, and thus, the reset voltage may be sampled to capacitors MC1 and VC1 of the first output circuit 110 and capacitors MC2 and VC2 of the second output circuit 120. The readout circuit may obtain a digital reset signal by comparing the reset voltage output from the first output circuit 210 and the second output circuit 220 with the ramp voltage RMP during the second readout time RT2.

The readout circuit may calculate a difference between the digital reset signal and the first digital pixel signal to obtain a first digital signal, and may calculate a difference between the digital reset signal and the second digital pixel signal to obtain a second digital signal. The first pixel voltage reflects the light output from the light source and the influence of the ambient light, whereas the second pixel voltage reflects only the effect of the ambient light so that the difference between the first digital signal and the second digital signal is calculated to eliminate the influence of ambient light. Accordingly, the image sensor may acquire accurate image data generated by light output from the light source.

On the other hand, referring to FIG. 12, the first enable element EX1 and the second enable element EX2 may maintain a turned-off state. By maintaining the first enable element EX1 and the second enable element EX2 in a turned-off state, the capacity of the first output circuit 210 and the second output circuit 220 may be reduced, and a settling time required for the sampling operation may be reduced. Accordingly, despite the two exposure times EIT1 and EIT2, a function of removing ambient light may be implemented while significantly inhibiting a decrease in the operation speed of the image sensor.

Figure 13:
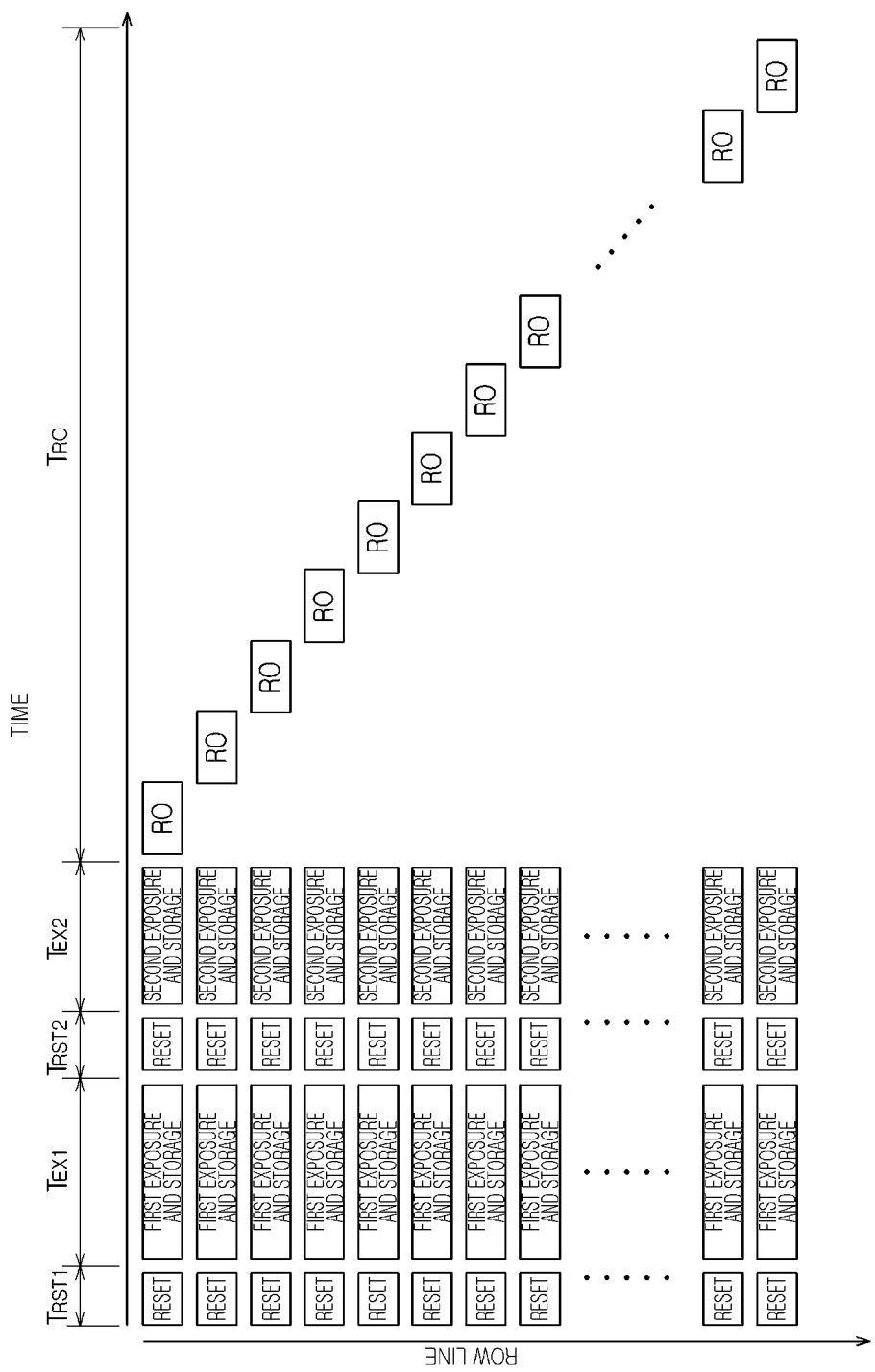
FIG. 13 is a diagram provided to illustrate an operation of an image sensor according to an example embodiment.

FIG. 13 is a diagram provided to describe the operation of an image sensor according to an example embodiment. In the example embodiment illustrated in FIG. 13, the image sensor may operate in a global shutter method. During the first reset time TRST1 the reset element and the transfer element included in the pixels are turned on to remove electrical charges from the photodiode and the floating diffusion node in each of the pixels. Accordingly, the voltage of the floating diffusion node may be completely reset.

During the first exposure time $T_{EX1}$, the pixels may be simultaneously exposed to light, and photodiodes may react to the light to generate electrical charge. The first pixel voltage corresponding to the electrical charge generated by the photodiodes during the first exposure time $T_{EX1}$ may be sampled by the first output circuit included in each of the pixels. As an example, electrical charges generated by photodiodes during the first exposure time $T_{EX1}$ may be stored in a capacitor included in the first output circuit.

When the first exposure time $T_{EX1}$ elapses, the reset element and the transfer element included in the pixels are turned on again to remove electrical charges from the photodiode and the floating diffusion node in each of the pixels. For example, electrical charges from the photodiode and the floating diffusion node may be removed during the second reset time TRST2.

During the second exposure time $T_{EX2}$, the operation of the pixels may be similar to the operation of the first exposure time $T_{EX1}$, and the second exposure time $T_{EX2}$ may be shorter than the first exposure time $T_{EX1}$. The second pixel voltage corresponding to the electrical charge generated by the pixels during the second exposure time $T_{EX2}$ may be sampled by the second output circuit of each of the pixels. Due to a difference between the first exposure time $T_{EX1}$ and the second exposure time $T_{EX2}$, the first pixel voltage and the second pixel voltage may be different from each other.

For example, the electrical charge generated by the photodiodes during the first exposure time $T_{EX1}$ may be greater than the electrical charge generated by the photodiodes during the second exposure time $T_{EX2}$. The image sensor may read a first pixel voltage and a second pixel voltage from the respective pixels during the readout time TRO, and may generate image data using the first pixel voltage and the second pixel voltage. For example, by generating one image data using the first pixel voltage and the second pixel voltage, the dynamic range of the image data may be improved.

The image sensor may also set conversion gains of pixels differently at the first exposure time $T_{EX1}$ and the second exposure time $T_{EX2}$, respectively. For example, a first conversion gain of each of the pixels during the first exposure time $T_{EX1}$ may be smaller than a second conversion gain of each of the pixels during the second exposure time $T_{EX2}$.

In the example embodiment illustrated in FIG. 13, since the first output circuit of each of the pixels samples the first pixel voltage, and the second output circuit samples the second pixel voltage, the readout circuit of the image sensor during the readout time TRO may first read the first pixel voltage and the second pixel voltage and then may read the reset voltage later. To read the reset voltage, the first pixel voltage and the second pixel voltage may be read, and then, the reset operation may be executed.

Figure 14:
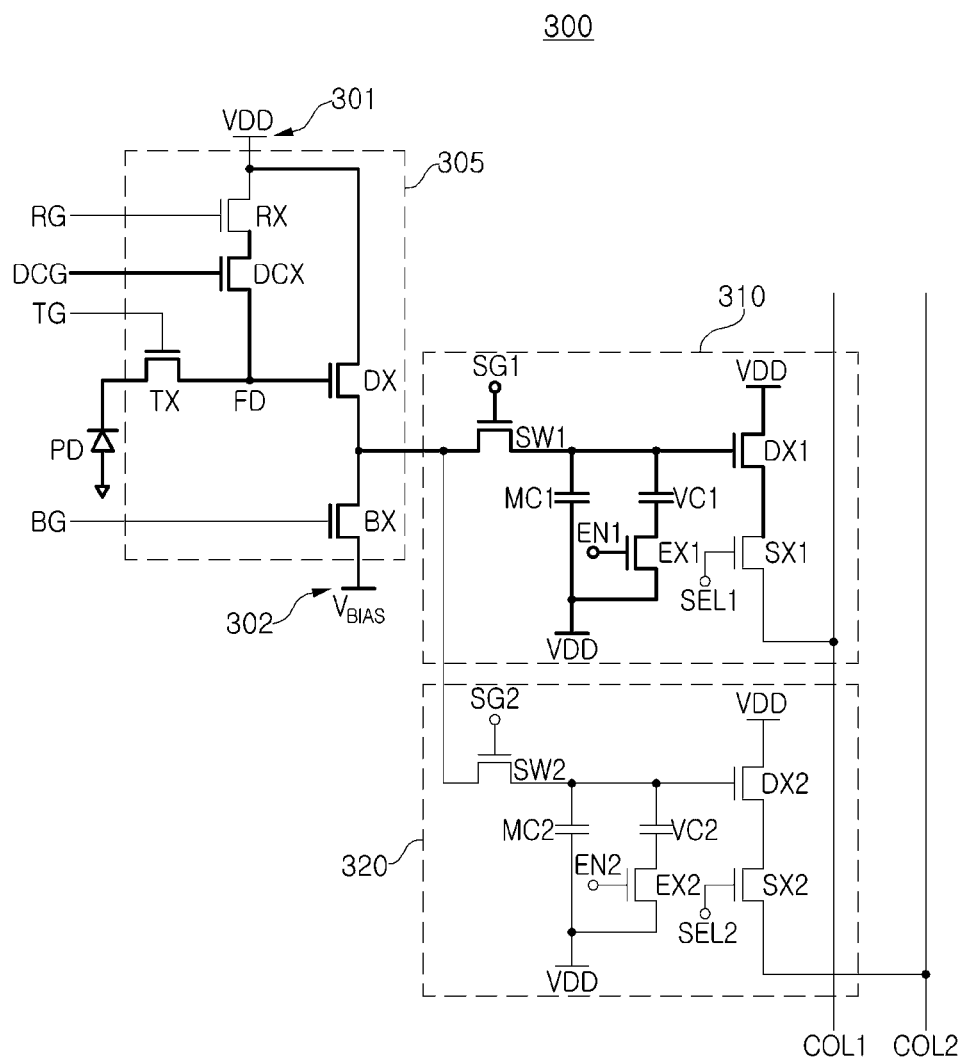
FIGS. 14 to 16 are views provided to illustrate the operation of an image sensor according to an example embodiment.
Figure 15:
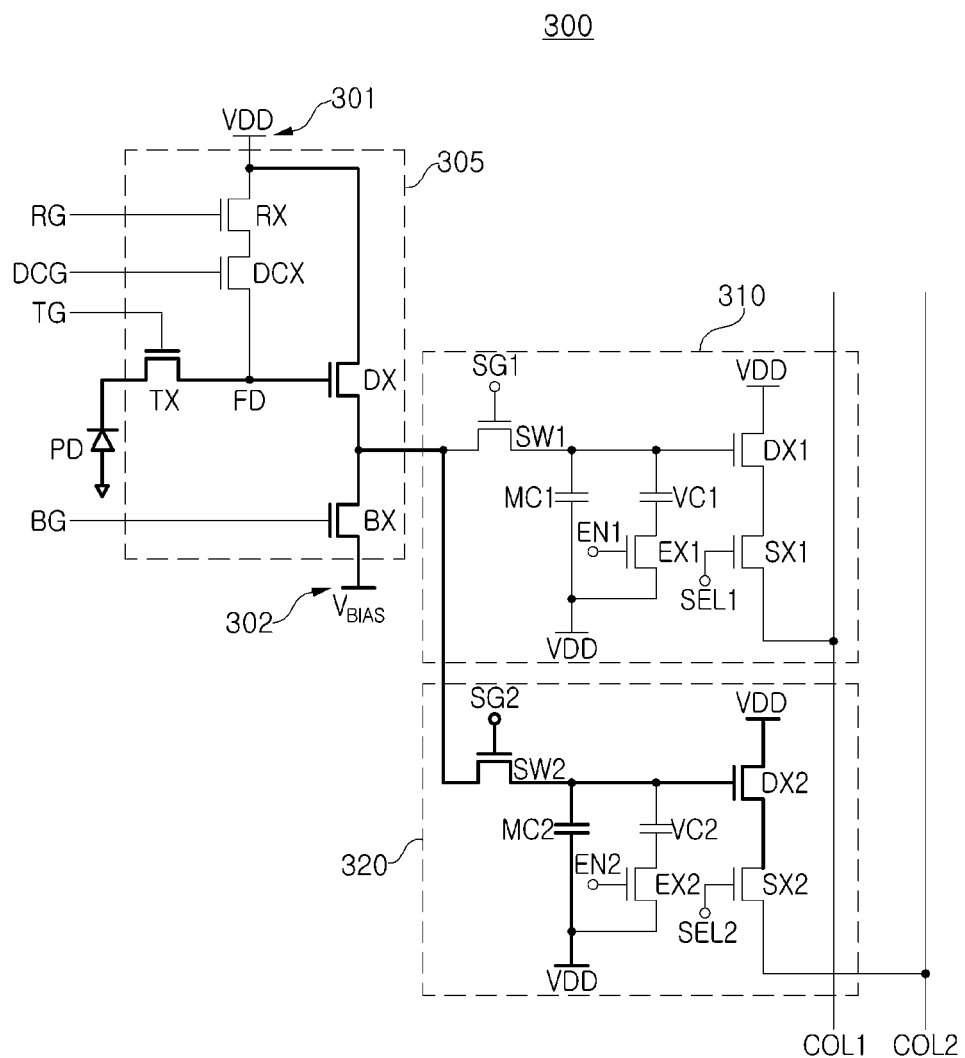
Figure 16:
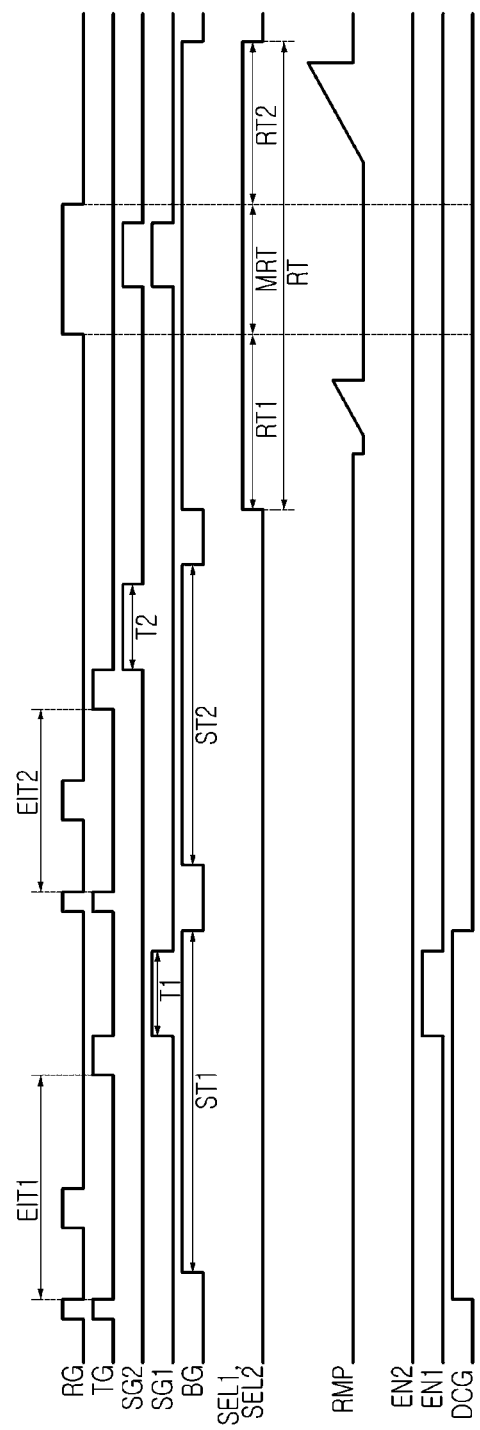

FIGS. 14 to 16 are diagrams provided to illustrate the operation of the image sensor according to an example embodiment. Referring to FIGS. 14 and 15, a pixel 300 of an image sensor may include a photodiode PD, a pixel circuit 305, a first output circuit 310, a second output circuit 320, and the like. The configuration and operation of the first output circuit 310 and the second output circuit 320 may be similar to those described with reference to FIG. 3.

On the other hand, referring to FIGS. 14 and 15, the pixel circuit 305 may further include a conversion gain control element DCX in addition to the transfer element TX, the reset element RX, and the driving element DX. The conversion gain control element DCX is connected between the reset element RX and the floating diffusion node FD, and may be controlled by a conversion gain control signal DCG. For example, when the conversion gain control element DCX is turned on, the capacity of the floating diffusion node FD may increase and the conversion gain of the pixel circuit 305 may decrease. Conversely, when the conversion gain control element DCX is turned off, the capacity of the floating diffusion node FD may decrease and the conversion gain of the pixel circuit 305 may increase.

FIG. 14 may be a diagram for describing an operation of the pixel 300 during a relatively long exposure time, and FIG. 15 may be a diagram for describing an operation of the pixel 300 during a relatively short exposure time. Hereinafter, the operation of the pixel 300 will be described with reference to FIG. 16.

Referring to FIG. 16, in the operation of the pixel 300, first, the reset element RX and the transfer element TX may be turned on by a reset control signal RG and a transfer control signal TG, and electrical charges of the photodiode PD and the floating diffusion node FD may be removed. When the reset operation is completed, the first exposure time EIT1 may start. During the first exposure time EIT1, the photodiode PD is exposed to light to generate electrical charge, and when the first exposure time EIT1 elapses, the transfer element TX is turned on and electrical charge of the photodiode PD may move to the floating diffusion node FD. When the first exposure time EIT1 starts, the conversion gain control element DCX is turned on so that the conversion gain of the pixel circuit 305 may decrease.

When the first exposure time EIT1 elapses, the transfer element TX may be turned off, and the first switching element SW1 may be turned on by the first switch control signal SG1 during the first sampling time T1. During the first sampling time T1, as illustrated in FIG. 14, the first output circuit 310 may sample the first pixel voltage output from the driving element DX. The first pixel voltage may be a voltage corresponding to electrical charge generated by the photodiode PD during the first exposure time EIT1. During the first sampling time T1, the first enable element EX1 is turned on so that the first secondary capacitor VC1 may be connected to the first switching element SW1.

On the other hand, while the first output circuit 310 samples the first pixel voltage, the bias element BX is turned on to supply a bias current required for the operation of the driving element DX. As an example, the bias element BX may be turned on for a first storage time ST1 that is longer than the first sampling time T1. At least a portion of the first storage time ST1 may overlap the first exposure time EIT1.

When the first sampling time T1 and the first storage time ST1 are finished, the reset element RX and the transfer element TX are turned on again, and the floating diffusion node FD and the photodiode PD are may be reset. After the reset operation, the photodiode PD may be exposed to light during the second exposure time EIT2 to generate electrical charge. The second exposure time EIT2 may be shorter than the first exposure time EIT1, and the conversion gain control element DCX may not be turned on during the second exposure time EIT2.

When the second exposure time EIT2 elapses, the transfer element TX is turned on, the electrical charge of the photodiode PD moves to the floating diffusion node FD, and the driving element DX may operate as a source-follower amplifier by the turned-on bias element BX. Also, the second switching element SW2 is turned on during the second sampling time T2, and the second output circuit 120 may sample the second pixel voltage as illustrated in FIG. 11. The second pixel voltage may be a voltage corresponding to the electrical charge generated by the photodiode PD during THE second exposure time EIT2 shorter than the first exposure time EIT1.

When the second sampling time T2 and the second storage time ST2 elapse, the readout circuit of the image sensor may read the first pixel voltage and the second pixel voltage during the first readout time RT1. During the first readout time RT1, the readout circuit of the image sensor compares each of the first pixel voltage and the second pixel voltage with the ramp voltage RMP to obtain a first digital pixel signal and a second digital pixel signal.

When the first readout time RT1 elapses, the reset element RX is turned on to reset the floating diffusion node FD. At this time, the first switching element SW1 and the second switching element SW2 together with the reset element RX may be turned on so that the reset voltage is sampled to the first output circuit 310 and the second output circuit 320. The readout circuit may obtain a digital reset signal by comparing the reset voltages output from the first output circuit 310 and the second output circuit 320 with the ramp voltage RMP during the second readout time RT2.

In the example embodiment described with reference to FIGS. 14 to 16, the logic circuit of the image sensor may set the first exposure time EIT1 and the second exposure time EIT2 shorter than the first exposure time EIT1, during one frame period. The logic circuit may connect the first output circuit 310 to the pixel circuit 305, between the first exposure time EIT1 and the second exposure time EIT2, and may connect the second output circuit 320 to the pixel circuit 305 after the second exposure time EIT2. Accordingly, the logic circuit may acquire the first digital pixel signal, the second digital pixel signal, and the digital reset signal during one frame period.

The logic circuit of the image sensor may calculate a difference between a digital reset signal and a first digital pixel signal to obtain a first digital signal, and may calculate a difference between the digital reset signal and a second digital pixel signal to obtain a second digital signal. The first digital signal may correspond to a relatively long first exposure time EIT1, and the second digital signal may correspond to a relatively short second exposure time EIT2. Further, the first digital signal may be a signal generated under a relatively lower conversion gain condition than the second digital signal. By generating image data using the first digital signal and the second digital signal, the dynamic range of the image data may be improved.

Figure 17:
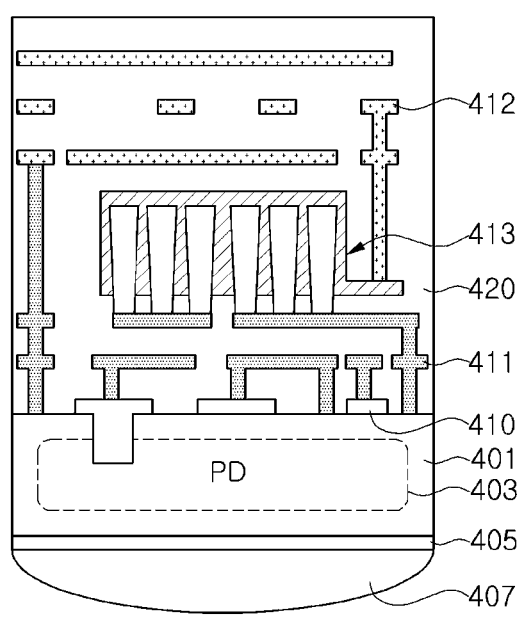
FIG. 17 is a diagram illustrating a portion of pixels included in an image sensor according to an example embodiment.

FIG. 17 is a diagram illustrating a portion of pixels included in an image sensor according to an example embodiment. Referring to FIG. 17, an image sensor 400 may include a semiconductor substrate 401, a photodiode 403 and elements 410 formed in the semiconductor substrate 401, and metal wirings 411 and 412 connected to the elements 410, an insulating layer 420 filling the elements 410 and the metal wirings 411 and 412, and the like. The semiconductor substrate 401 may be a substrate including a semiconductor material such as silicon, and the photodiode 403 may be formed in the semiconductor substrate 401. For example, the photodiode 403 may be formed by a process of implanting impurities into the semiconductor substrate 401, and the photodiode 403 may be connected to at least one of the elements 410.

A light transmitting layer 405 and a microlens 407 may be formed on one surface of the semiconductor substrate 401. The light transmitting layer 405 may include a color filter that selectively transmits light of a specific wavelength band. According to example embodiments, in at least some of pixels disposed in different positions in the image sensor 400, the microlenses 407 may be formed to have different curvature radii. Accordingly, in at least some of the pixels, the upper surfaces of the microlenses 407 may be positioned at different heights.

The elements 410 may provide a pixel circuit, a first output circuit, and a second output circuit. For example, the elements 410 may include a transfer element, a reset element, driving elements, switching elements, selection elements, enable elements, and the like. The elements 410 are connected to the photodiode 403 and may also be connected to capacitors 413 buried in the insulating layer 420 through metal wirings 411 and 412. As an example, the capacitors 413 may be connected to a switching element and an enable element among the elements 410, and the primary capacitors among the capacitors 413 may be connected to wiring, which supplies a power voltage among the metal wirings 411 and 412.

The manufacturing process of the capacitors 413 may include a process of forming a dielectric film. To improve the leakage characteristics of the capacitors 143, a process of forming a dielectric film may be performed at a relatively high temperature. In an example embodiment, lower wirings 411 formed before formation of the capacitors 413 may be formed of tungsten so that the dielectric film may be formed at a high temperature. On the other hand, upper wirings 412 formed later than the formation of the capacitors 413 may be formed of copper or the like, which is only an example embodiment, and thus, the lower wirings 411 and the upper wirings 412 may be formed of the same material.

Figure 18:
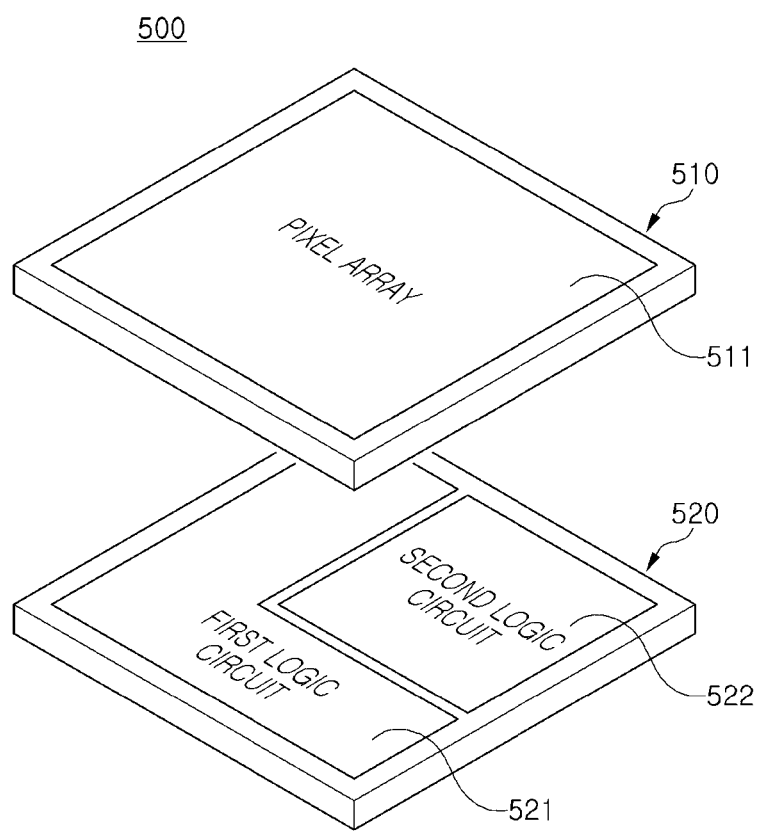
FIGS. 18 and 19 are diagrams schematically illustrating image sensors according to example embodiments.
Figure 19:
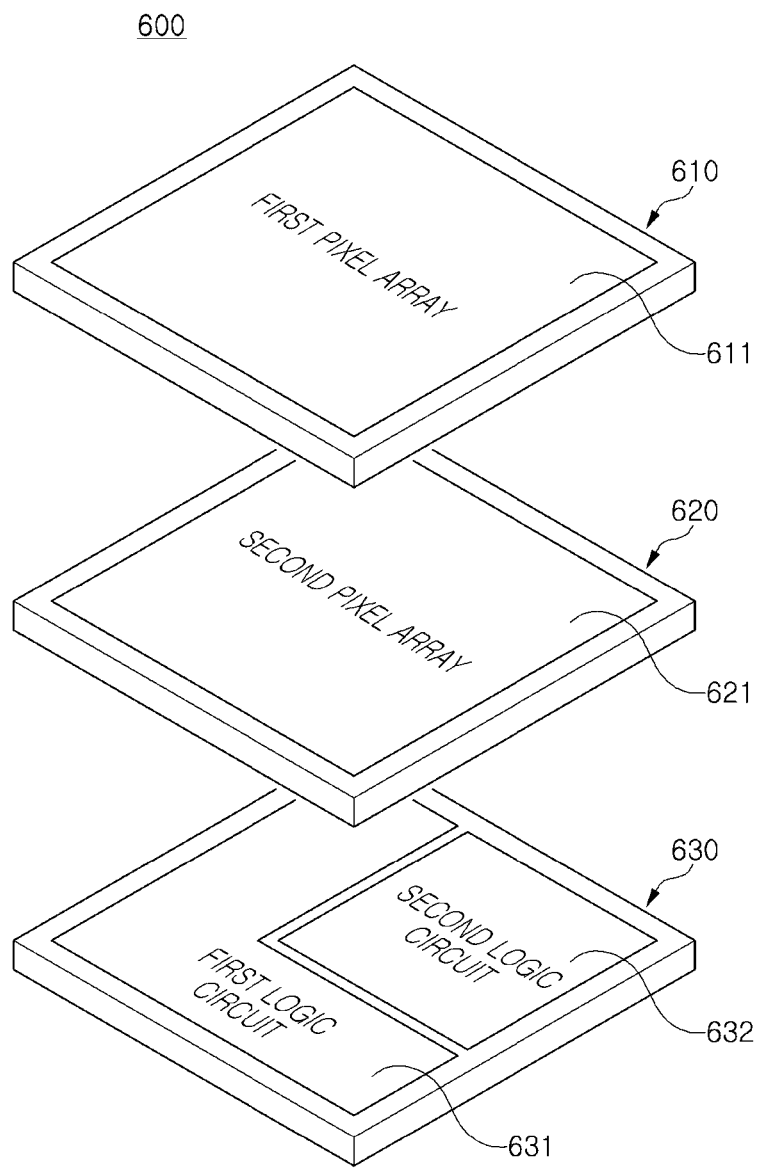

FIGS. 18 and 19 are diagrams schematically illustrating an image sensor according to an example embodiment. First, referring to FIG. 18, an image sensor 500 according to an example embodiment may include a first layer 510 and a second layer 520. The first layer 510 and the second layer 520 may be stacked in a vertical direction. The first layer 510 may include a pixel array 511, and the second layer 520 may include logic circuits 521 and 522. The pixel array 511 includes a plurality of pixels, and the plurality of pixels may be connected to the logic circuit 521 through a plurality of row lines and a plurality of column lines. In the example embodiment illustrated in FIG. 18, each of the pixels disposed in the pixel array 511 in the first layer 510 may include a pixel circuit, a first output circuit, and a second output circuit. Accordingly, each of the pixels may have a structure similar to that of the example embodiment described above with reference to FIG. 17.

The logic circuits 521 and 522 may include a first logic circuit 521 and a second logic circuit 522. The first logic circuit 521 may include a row driver, a readout circuit, a column driver, and control logic necessary for driving the pixel array 511. The second logic circuit 522 may include a power circuit, an input/output interface, an image signal processor, and the like. The area and arrangement form occupied by the respective first and second logic circuits 521 and 522 may be variously modified.

Next, referring to FIG. 19, an image sensor 600 may include a first layer 610, a second layer 620, and a third layer 630 that are sequentially stacked. The first layer 610, the second layer 620, and the third layer 630 may be formed on different semiconductor substrates, to be stacked on each other. The third layer 630 includes a first logic circuit 631 and a second logic circuit 632, and the configurations of the first logic circuit 631 and the second logic circuit 632 may be similar to those described with reference to FIG. 18.

The first layer 610 may include a first pixel array 611, and the second layer 620 may include a second pixel array 621. The first pixel array 611 and the second pixel array 621 may be connected to each other to provide a plurality of pixels. As an example, each of the pixels may include a photodiode, a pixel circuit, a first output circuit, a second output circuit, and the like, as in the other embodiments described above, and the photodiode and the pixel circuit may be disposed in the first pixel array 611, and the first output circuit and the second output circuit may be disposed in the second pixel array 621. The pixel circuit of the first pixel array 611 may be connected to the first output circuit and the second output circuit of the second pixel array 621 by a method such as Cu—Cu bonding or the like.

A process of forming capacitors included in the first output circuit and the second output circuit may be performed at a relatively high temperature to improve leakage characteristics of the capacitors. Therefore, in a case in which the pixel circuit, the first output circuit, and the second output circuit are all formed in one layer, the pixel circuit, the wiring patterns directly connected to the first output circuit, the second output circuit and the pixel circuit may be required to be formed of tungsten.

Meanwhile, in the example embodiment illustrated in FIG. 19, since the processes of the pixel circuit, the first output circuit, and the second output circuit are separated from each other, wiring patterns connected to the reset element, the transfer element, the driving element, etc. of the pixel circuit may be formed of copper or the like, which has a melting point lower than that of tungsten, but has excellent reflectance and resistance properties. Since the wiring patterns formed of copper having relatively high reflectivity are disposed below the photodiode and the pixel circuit, photoelectric conversion efficiency of the image sensor may be improved. In addition, according to example embodiments, all elements included in the pixel circuit, the first output circuit, and the second output circuit may be formed in the first layer 610, and separately, capacitors may be formed in the second layer 620. In this case, most of the metal wirings for connecting the elements and capacitors in the pixel circuit, the first output circuit, and the second output circuit may be formed of copper, and thus, resistance characteristics may be improved, which will be described below in more detail with reference to FIGS. 20 and 21.

Figure 20:
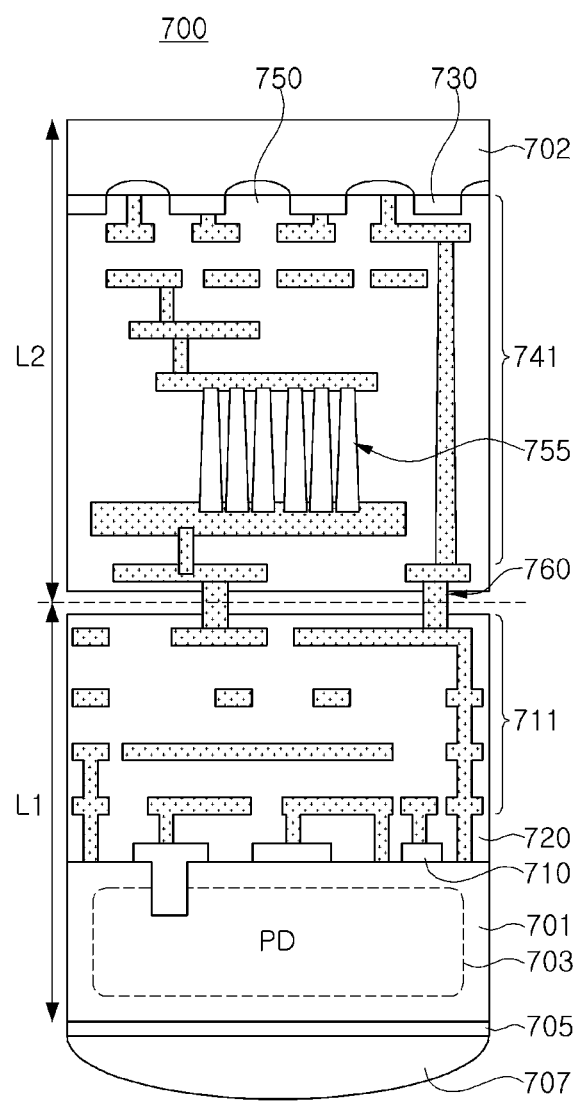
FIG. 20 is a diagram illustrating a portion of pixels included in an image sensor according to an example embodiment.
Figure 21:
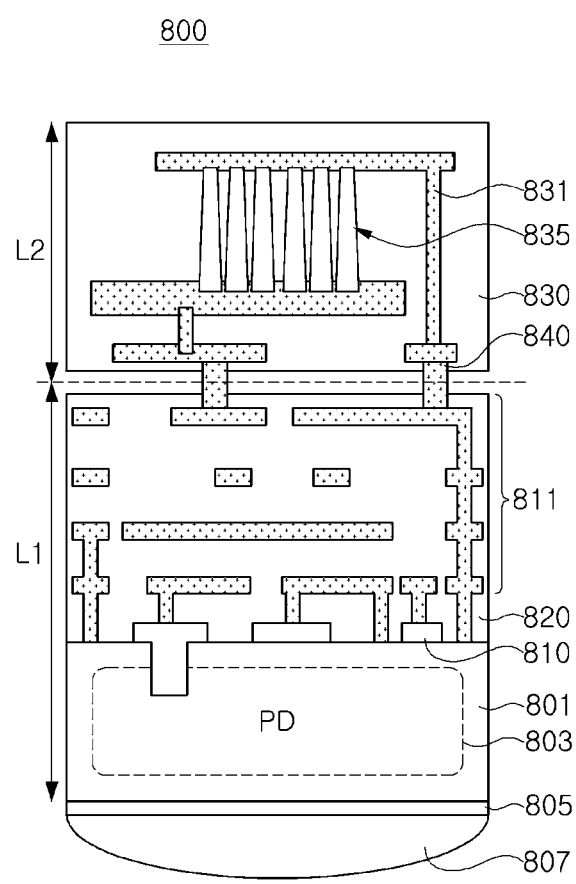
FIGS. 21 and 22 are views illustrating a portion of pixels included in an image sensor according to an example embodiment.
Figure 22:
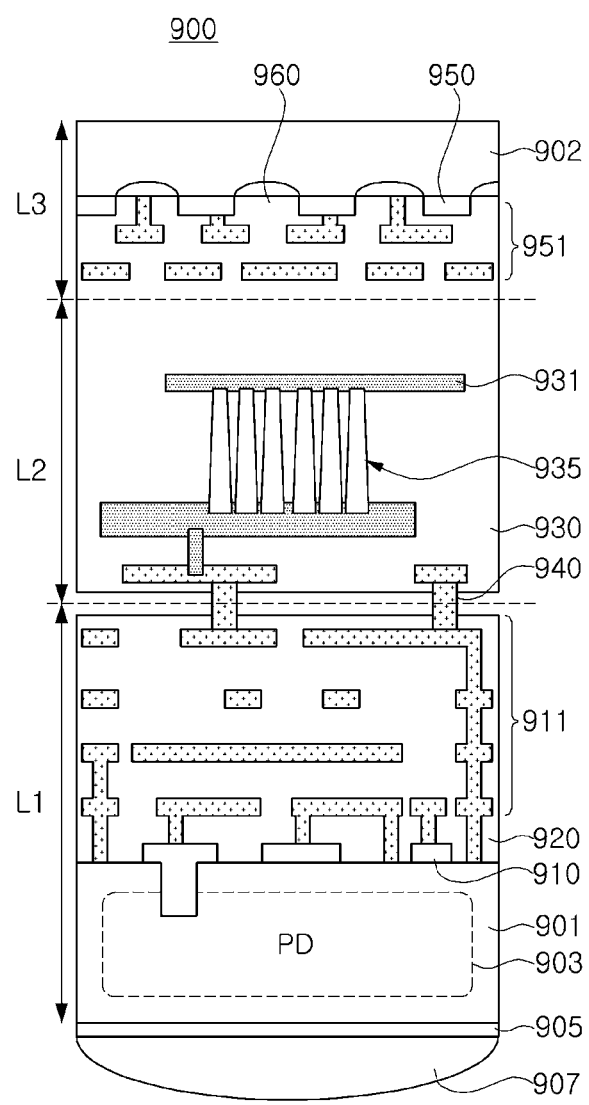

FIGS. 20 to 22 are diagrams illustrating some of pixels included in an image sensor according to an example embodiment. First, referring to FIG. 20, an image sensor 700 according to an example embodiment may include a first layer L1 and a second layer L2. According to example embodiments, a third layer on which logic circuits are formed may be added on the second layer L2. Alternatively, logic circuits may also be formed together with pixels in the first layer L1 or the second layer L2.

In the example embodiment illustrated in FIG. 20, the first layer L1 may include a photodiode 703 and a pixel circuit among constituent elements of each of the pixels. Referring to the first layer L1, a photodiode 703 is formed in a first semiconductor substrate 701, and a light transmitting layer 705 and a microlens 707 may be formed on one surface of the first semiconductor substrate 701. In addition, elements 710 included in the pixel circuit are formed on the first semiconductor substrate 701, and the elements 710 and metal wirings 711 connected to the elements 710 may be buried in an insulating layer 720. The elements 710 may provide a transfer element, a reset element, a driving element, a conversion gain control element, a floating diffusion node, and the like.

The second layer L2 is disposed on the first layer L1 and may include a first output circuit and a second output circuit among constituent elements of each of the pixels. The second layer L2 may include elements 730 formed on a second semiconductor substrate 702 and included in the first output circuit or the second output circuit. The elements 730 are connected to each other by metal wirings 741, and the elements 730 and the metal wirings 741 may be buried in an insulating layer 750. At least a portion of the metal wirings 741 of the second layer L2 may be connected to at least a portion of the metal wirings 711 of the first layer L1 through a bonding pattern 760. In detail, the second layer L2 may be connected to the first layer L1 by the Cu—Cu bonding method or the like. For example, the bonding pattern 760 may be a node in which a first switching element and a second switching element included in the first and second output circuits, respectively, are connected to the driving element of the pixel circuit.

The second layer L2 may include capacitors 755 buried in the insulating layer 750. The capacitors 755 are components included in the first and second output circuits; the capacitors 755 can be advantageously used to sample a pixel voltage and/or a reset voltage generated by the pixel circuit of the first layer L1. For example, the capacitors 755 may include a primary capacitor and a secondary capacitor, the primary capacitor may be connected to a power node and a switching element, and the secondary capacitor may be connected to an enable element and a switching element.

Next, referring to FIG. 21, an image sensor 800 according to an example embodiment may include a first layer L1 and a second layer L2. Hereinafter, descriptions of components that are similar to those of FIG. 20 or that may be understood with reference to FIG. 20 will be omitted. In the example embodiment illustrated in FIG. 21, only capacitors 835 may be formed in the second layer L2, and elements 810 for providing a pixel circuit, a first output circuit, and a second output circuit may all be formed in the first layer L1 together with the photodiode 803. For example, photodiodes 803 and elements 810 included in the pixel circuit and the first and second output circuits are formed in a first semiconductor substrate 801, and metal wirings 811 and an insulating layer 820 may be formed. In this case, a bonding pattern 840 for connecting the capacitors 835 of the second layer L2 and the metal wirings 811 may be formed in the first layer L1.

In addition, capacitors 835, metal wirings 831, and an insulating layer 830 are formed on a second semiconductor substrate different from the first semiconductor substrate 801, and the bonding patterns 840 are connected to each other by Cu—Cu bonding, such that the first layer L1 and the second layer L2 may be attached to each other. When the first layer L1 and the second layer L2 are attached to each other, a partial region of the first semiconductor substrate 801 is removed from the first layer L1 by a polishing process, etc., and a light transmitting layer 805 and a microlens 807 may be formed. Optionally, the second semiconductor substrate for the formation of the capacitors 835 may be removed by a polishing process or the like, and the insulating layer 830 may be exposed.

In the example embodiment illustrated in FIG. 21, a logic circuit for driving pixels and generating image data may be disposed in at least one of the first layer L1 and the second layer L2. When at least a portion of the logic circuit is disposed in the second layer L2, the second semiconductor substrate for forming the second layer L2 may not be removed by a polishing process or the like.

Also, according to example embodiments, the logic circuit may be provided by a third layer L3 disposed on the second layer L2. Referring to FIG. 22, a second semiconductor substrate for forming a second layer L2 of an image sensor 900 may be completely removed by a polishing process, or the like, and a third layer L3 may be disposed on the second layer L2. The third layer L3 may include a third semiconductor substrate 902, elements 950 providing a logic circuit, metal wirings 951, an insulating layer 960, and the like. In an example embodiment, a portion of the metal wirings 951 of the third layer L3 may penetrate through the insulating layer 930 of the second layer L2, and may be connected to at least one of the metal wirings 911 of the first layer L1 by a vertical via disposed on outside of the pixels.

Figure 23:
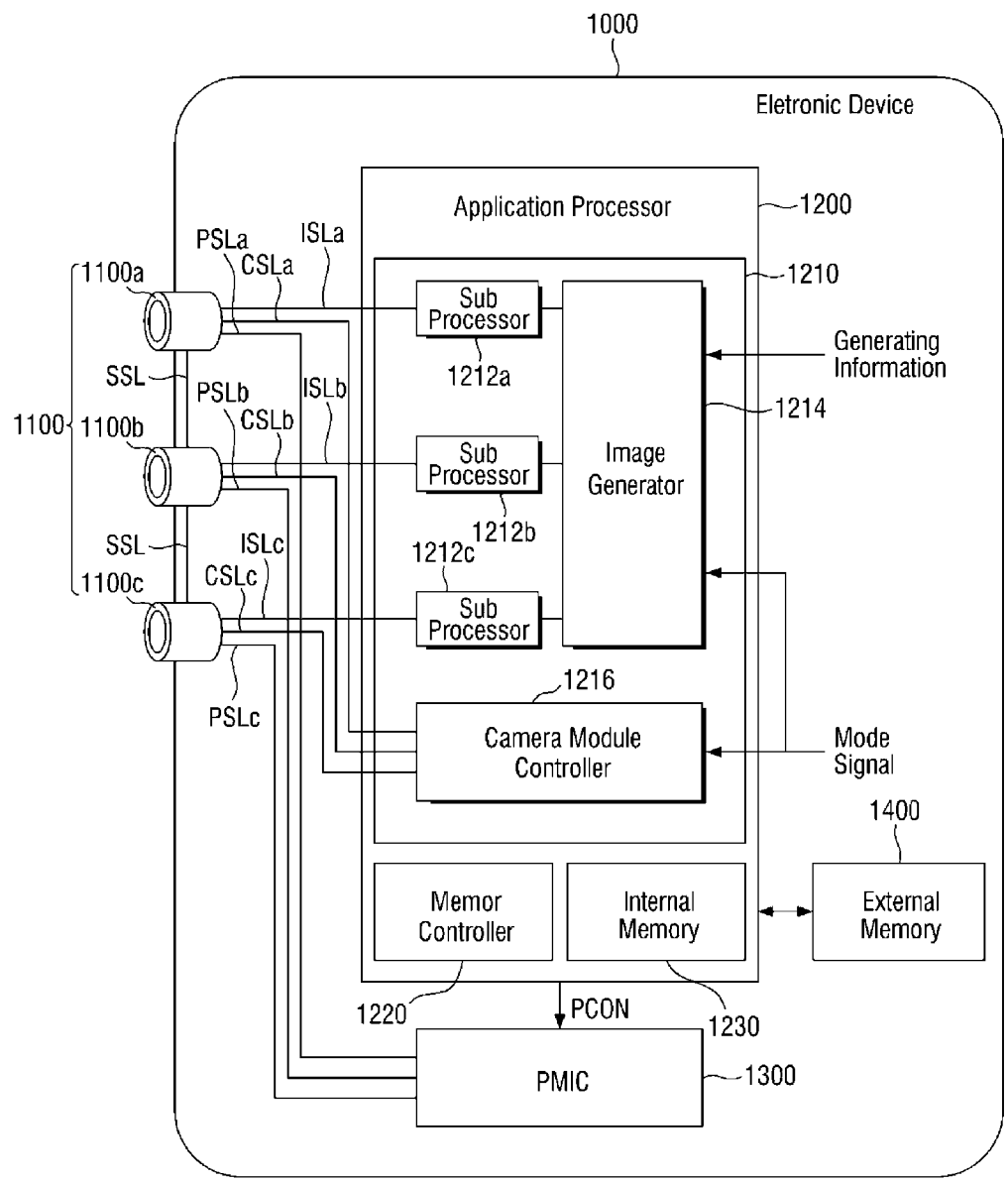
FIGS. 23 and 24 are diagrams schematically illustrating electronic devices including an image sensor according to example embodiments.
Figure 24:
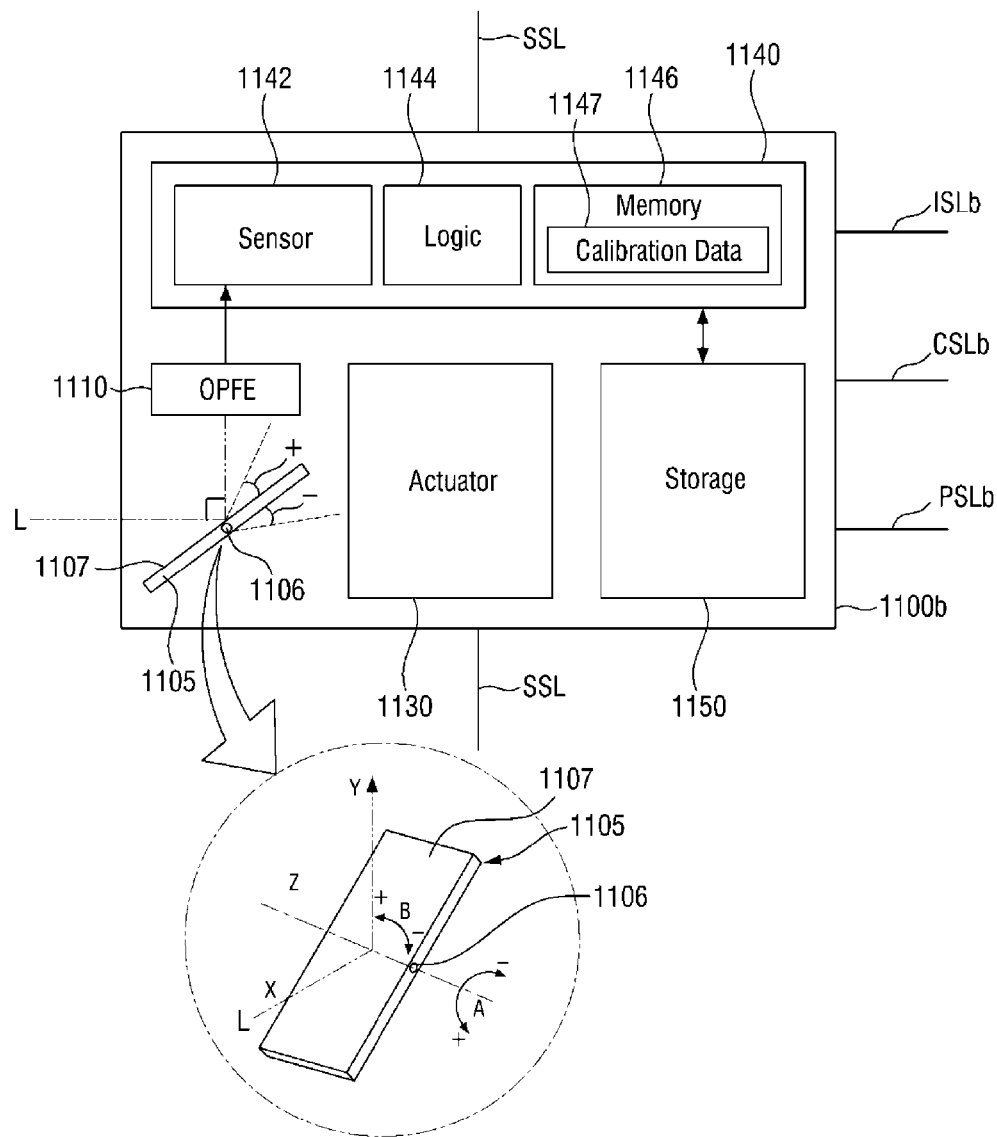

FIGS. 23 and 24 are diagrams schematically illustrating an electronic device including an image sensor according to an example embodiment. Referring to FIG. 23, an electronic device 1000 may include a camera module group 1100, an application processor 1200, a PMIC 1300, and an external memory 1400. The camera module group 1100 may include a plurality of camera modules 1100a, 1100b, and 1100c. Although the drawing illustrates an example embodiment in which three camera modules 1100a, 1100b, and 1100c are disposed, the example embodiments are not limited thereto. In some embodiments, the camera module group 1100 may be modified to include only two camera modules. In addition, in some embodiments, the camera module group 1100 may be modified and implemented to include n (where n is a natural number of 4 or more) camera modules. In addition, in an example embodiment, at least one of the plurality of camera modules 1100a, 1100b, and 1100c included in the camera module group 1100 may include the image sensor according to one of the example embodiments described with reference to FIGS. 1 to 22 above.

Hereinafter, a detailed configuration of a camera module 1100b will be described in more detail with reference to FIG. 24, but the following description may be equally applied to other camera modules 1100a and 1100b according to example embodiments. Referring to FIG. 24, the camera module 1100b includes a prism 1105, an optical path folding element (hereinafter referred to as "OPFE") 1110, an actuator 1130, an image sensing device 1140, and a storage unit 1150.

The prism 1105 may include a reflective surface 1107 of a light reflecting material to change the path of light L incident from the outside thereof. In some embodiments, the prism 1105 may change the path of the light L incident in a first direction X into a second direction Y perpendicular to the first direction X. In addition, the prism 1105 rotates the reflective surface 1107 of the light reflecting material in an A direction around a central axis 1106, or rotates the central axis 1106 in a B direction, to change the path of the light L incident in the first direction X to the second direction Y that is a vertical direction. In this case, the OPFE 1110 may also move in a third direction Z perpendicular to the first direction X and the second direction Y.

In some embodiments, as illustrated, a maximum rotation angle of the prism 1105 in the A direction may be equal to or less than 15 degrees in the plus (+) A direction, and may be greater than 15 degrees in the minus (−) A direction, but the embodiments are not limited thereto. In some embodiments, the prism 1105 may move between 20 degrees in a plus (+) or minus (−) B direction, or between 10 degrees and 20 degrees, or between 15 degrees and 20 degrees. In this case, the angle of movement may move at the same angle in the plus (+) or minus (−) B direction, or may move to an almost similar angle to about 1 degree.

In some embodiments, the prism 1105 may move the reflective surface 1106 of the light reflecting material in the third direction (e.g., the Z direction) parallel to the extending direction of the central axis 1106.

The OPFE 1110 may include, for example, an optical lens comprised of m (where m is a natural number) groups. M lenses may move in the second direction Y to change the optical zoom ratio of the camera module 1100b. For example, when the basic optical zoom ratio of the camera module 1100b is Z, in the case of moving m optical lenses included in the OPFE 1110, the optical zoom ratio of the camera module 1100b may be changed to an optical zoom ratio of 3Z, 5Z or more than 5Z.

The actuator 1130 may move the OPFE 1110 or an optical lens, (hereinafter, referred to as an optical lens), to a specific position. For example, the actuator 1130 may adjust the position of the optical lens so that an image sensor 1142 is positioned at the focal length of the optical lens for accurate sensing.

The image sensing device 1140 may include the image sensor 1142, a control logic 1144, and a memory 1146. The image sensor 1142 may sense an image of a sensing target using light L provided through an optical lens. The control logic 1144 may control the overall operation of the camera module 1100b. For example, the control logic 1144 may control the operation of the camera module 1100b by a control signal provided through a control signal line CSLb.

The memory 1146 may store information, such as calibration data 1147, required for the operation of the camera module 1100b. The calibration data 1147 may include information necessary for the camera module 1100b to generate image data using the light L provided from the outside thereof. The calibration data 1147 may include, for example, information on a degree of rotation described above, information on a focal length, information on an optical axis, and the like. When the camera module 1100b is implemented in the form of a multi-state camera of which a focal length is changed based on the position of the optical lens, the calibration data 1147 may include the focal length values for respective positions (or per state) of the optical lens, and information related to autofocusing.

The storage unit 1150 may store image data sensed through the image sensor 1142. The storage unit 1150 may be disposed on outside of the image sensing device 1140, and may be implemented in a stacked form with a sensor chip constituting the image sensing device 1140. In some embodiments, the storage unit 1150 may be implemented as an Electrically Erasable Programmable Read-Only Memory (EEPROM), but the embodiments are not limited thereto.

Referring to FIGS. 23 and 24 together, in some embodiments, each of the plurality of camera modules 1100a, 1100b, and 1100c may include the actuator 1130. Accordingly, each of the plurality of camera modules 1100a, 1100b, and 1100c may include calibration data 1147 that are the same or different from each other based on the operation of the actuator 1130 included therein. In some further embodiments, one camera module (for example, 1100b) among the plurality of camera modules 1100a, 1100b and 1100c is a folded lens-type camera module including the prism 1105 and the OPFE 1110 described above, and the remaining camera modules (e.g., 1100a and 1100c) may be vertical-type camera modules that do not include the prism 1105 and the OPFE 1110, but the embodiments are limited thereto.

In additional embodiments, one camera module (e.g., 1100c) among the plurality of camera modules 1100a, 1100b and 1100c may be, for example, a vertical-type of depth camera for extracting depth information using Infrared Ray (IR). In this case, an application processor 1200 merges the image data provided from the depth camera with the image data provided from another camera module (for example, 1100a or 1100b) to generate a 3D depth image.

In still further embodiments, at least two camera modules (e.g., 1100a and 1100b) among the plurality of camera modules 1100a, 1100b, and 1100c may have different fields of view. In this case, for example, the optical lenses of at least two camera modules (e.g., 1100a and 1100b) among the plurality of camera modules 1100a, 1100b and 1100c may be different from each other, but the configuration is not limited thereto.

Also, in some embodiments, fields of view of the plurality of camera modules 1100a, 1100b, and 1100c may be different. In this case, optical lenses included in each of the plurality of camera modules 1100a, 1100b, and 1100c may also be different from each other, but the configuration is not limited thereto. In addition, the plurality of camera modules 1100a, 1100b, and 1100c may be physically separated from each other and disposed. For example, the sensing area of one image sensor 1142 is not divided and used by the plurality of camera modules 1100a, 1100b and 1100c, but an independent image sensor 1142 may be disposed inside each of the plurality of camera modules 1100a, 1100b, and 1100c.

Referring back to FIG. 23, the application processor 1200 may include an image processing device 1210, a memory controller 1220, and an internal memory 1230. The application processor 1200 may be implemented separately from the plurality of camera modules 1100a, 1100b, and 1100c. For example, the application processor 1200 and the plurality of camera modules 1100a, 1100b, and 1100c may be implemented by being separated from each other as separate semiconductor chips.

The image processing device 1210 may include a plurality of sub-image processors 1212a, 1212b, and 1212c, an image generator 1214, and a camera module controller 1216. The image processing device 1210 may include the plurality of sub-image processors 1212a, 1212b, and 1212c corresponding to the number of the plurality of camera modules 1100a, 1100b and 1100c.

Image data generated from the camera modules 1100a, 1100b and 1100c, respectively, may be provided to corresponding sub-image processors 1212a, 1212b and 1212c through image signal lines ISLa, ISLb and ISLc separated from each other. For example, the image data generated from the camera module 1100a may be provided to the sub-image processor 1212a through the image signal line ISLa, the image data generated from the camera module 1100b may be provided to the sub-image processor 1212b through the image signal line ISLb, and the image data generated from the camera module 1100c may be provided to the sub-image processor 1212c through the image signal line ISLc. Such image data transmission may be performed using, for example, a camera serial interface (CSI) based on a Mobile Industry Processor Interface (MIPI), but the embodiments are not limited thereto.

On the other hand, in some embodiments, one sub-image processor may be disposed to correspond to a plurality of camera modules. For example, the sub image processor 1212a and the sub image processor 1212c are not implemented separately from each other as illustrated, but are implemented by being integrated into one sub image processor, and the image data provided from the camera module 1100a and the camera module 1100c may be selected through a selection element (e.g., a multiplexer) or the like, and then, may be provided to an integrated sub-image processor.

The image data provided to the respective sub-image processors 1212a, 1212b, and 1212c may be provided to the image generator 1214. The image generator 1214 may generate an output image using image data provided from the respective sub-image processors 1212a, 1212b and 1212c depending on image generating information or mode signal. Specifically, the image generator 1214 merges at least some of the image data generated from the camera modules 1100a, 1100b, and 1100c having different fields of view depending on the image generation information or mode signal to generate an output image. Also, the image generator 1214 may generate an output image by selecting any one of image data generated from the camera modules 1100a, 1100b, and 1100c having different fields of view depending on image generation information or a mode signal.

In some embodiments, the image generation information may include a zoom signal or zoom factor. Further, in some embodiments, the mode signal may be, for example, a signal based on a mode selected from a user. And, when the image generation information is a zoom signal (zoom factor), and the camera modules 1100a, 1100b and 1100c have different fields of view, the image generator 1214 may operate differently depending on the type of zoom signal. For example, when the zoom signal is a first signal; after merging the image data output from the camera module 1100a and the image data output from the camera module 1100c, the output image may be generated using the merged image signal, and image data output from the camera module 1100b not used for merging. If the zoom signal is a second signal different from the first signal, the image generator 1214 does not perform such image data merging, and may select any one of the image data output from the respective camera modules 1100a, 1100b and 1100c, to create an output image. However, embodiments are not limited thereto, and a method of processing image data may be modified and implemented as needed.

In some embodiments, the image generator 1214 receives a plurality of image data having different exposure times from at least one of the plurality of sub-image processors 1212a, 1212b and 1212c, and performs high dynamic range (HDR) processing for the plurality of image data, thereby generating merged image data having an increased dynamic range.

The camera module controller 1216 may provide a control signal to the respective camera modules 1100a, 1100b and 1100c. The control signal generated from the camera module controller 1216 may be provided to the corresponding camera modules 1100a, 1100b and 1100c through control signal lines CSLa, CSLb and CSLc separated from each other.

Any one of the plurality of camera modules 1100a, 1100b and 1100c is designated as a master camera (e.g., 1100b) depending on a mode signal or image generation information including a zoom signal, and the remaining camera modules, for example, 1100a and 1100c, may be designated as slave cameras. Such information may be included in the control signal and may be provided to the corresponding camera modules 1100a, 1100b and 1100c through the control signal lines CSLa, CSLb, and CSLc which are separated from each other.

Camera modules operating as masters and slaves may be changed depending on a zoom factor or an operation mode signal. For example, when the field of view of the camera module 1100a is wider than a field of view of the camera module 1100b and represents a zoom ratio having a relatively low zoom factor, the camera module 1100b may operate as a master, and the camera module 1100a is a slave. Conversely, when the zoom factor indicates a high zoom ratio, the camera module 1100a may operate as a master and the camera module 1100b may operate as a slave.

In some embodiments, a control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit a sync enable signal to the camera module 1100b. The camera module 1100b having received such a sync enable signal generates a sync signal based on the received sync enable signal, and may transmit the generated sync signal to the camera modules 1100a and 1100c via a sync signal line SSL. The camera module 1100b and the camera modules 1100a and 1100c may be synchronized with the sync signal to transmit image data to the application processor 1200.

In some embodiments, a control signal provided from the camera module controller 1216 to the plurality of camera modules 1100a, 1100b and 1100c may include mode information according to the mode signal. Based on this mode information, the plurality of camera modules 1100a, 1100b, and 1100c may operate in a first operation mode and a second operation mode in relation to the sensing speed.

In the first operation mode, the plurality of camera modules 1100a, 1100b and 1100c may generate an image signal at a first rate (e.g., generate an image signal at a first frame rate), may encode the generated image signal at a second rate higher than the first rate (e.g., encode an image signal having a second frame rate higher than the first frame rate), and may transmit the encoded image signal to the application processor 1200. In this case, the second rate may be 30 times or less of the first rate.

The application processor 1200 stores the received image signal, for example, the encoded image signal, in the internal memory 1230 provided therein, and the external memory 1400 provided on the outside of the application processor 1200, and then, reads the encoded image signal from the internal memory 1230 or the external memory 1400 and decode the signal, and may display image data generated based on the decoded image signal. For example, a corresponding subprocessor among the plurality of subprocessors 1212a, 1212b and 1212c of the image processing device 1210 may perform decoding, but may also perform image processing on the decoded image signal.

The plurality of camera modules 1100a, 1100b, and 1100c may generate an image signal at a third rate lower than the first rate in the second operation mode (e.g., generate an image signal having a third frame rate lower than the first frame rate), and may transmit the image signal to the application processor 1200. The image signal provided to the application processor 1200 may be an unencoded signal. The application processor 1200 may perform image processing on the received image signal or may store the image signal in the internal memory 1230 or the external memory 1400.

The PMIC 1300 may supply power, such as a power voltage, to the plurality of respective camera modules 1100a, 1100b and 1100c. For example, under the control of the application processor 1200, the PMIC 1300 supplies first power to the camera module 1100a through a power signal line PSLa, supplies second power to the camera module 1100b through a power signal line PSLb, and supplies third power to the camera module 1100c through a power signal line PSLc.

The PMIC 1300 may generate power corresponding to each of the plurality of camera modules 1100a, 1100b, and 1100c in response to a power control signal PCON from the application processor 1200, and may also adjust the power level. The power control signal PCON may include a power adjustment signal for each operation mode of the plurality of camera modules 1100a, 1100b, and 1100c. For example, the operation mode may include a low power mode, and in this case, the power control signal PCON may include information on a camera module operating in a low power mode and a set power level. Levels of powers provided to the plurality of respective camera modules 1100a, 1100b and 1100c may be the same or different from each other. Also, the level of power may be dynamically changed.

As set forth above, according to example embodiments, pixels are simultaneously exposed to light during an exposure time, and electrical charges generated during the exposure time may be stored in capacitors of each of the pixels. By adjusting the capacity of capacitors depending on the shooting environment such as the intensity of light incident on an image sensor or the intensity of the infrared light source operating in conjunction with the image sensor, the intensity of ambient light, and the like, noise characteristics and an operation speed of the image sensor and the quality of a resulting image output by the image sensor may be improved.

While example embodiments have been illustrated and described above, it will be apparent to those skilled in the art that modifications and variations could be made without departing from the scope of the present inventive concept as defined by the appended claims.

What is claimed is:

1. An image sensor, comprising:
a plurality of pixels, which respectively comprise:
a photodiode configured to generate electrical charges in response to light incident the image sensor;
a pixel circuit including a transfer element, which is electrically connected between the photodiode and a floating diffusion node that accumulates the electrical charges, and a driving element, which is electrically connected to the floating diffusion node;
a first output circuit electrically connected between a first column line and the pixel circuit, said first output circuit comprising: a first switching element electrically connected to an output terminal of the driving element, a first primary capacitor electrically connected to the first switching element, a first secondary capacitor electrically connected to or disconnected from the first switching element based on an on/off switching state of a first enable element, and a first selection element electrically connected between the first switching element and the first column line; and
a second output circuit electrically connected between a second column line and the pixel circuit, said second output circuit comprising: a second switching element electrically connected to the output terminal of the driving element, a second primary capacitor electrically connected to the second switching element, a second secondary capacitor electrically connected to or disconnected from the second switching element based on an on/off switching state of a second enable element, and a second selection element electrically connected between the second switching element and the second column line.

2. The image sensor of claim 1, wherein a capacity of the first primary capacitor is smaller than a capacity of the first secondary capacitor, and a capacity of the second primary capacitor is smaller than a capacity of the second secondary capacitor.

3. The image sensor of claim 1, further comprising a first analog-to-digital converter electrically coupled to the first column line, and a second analog-to-digital converter electrically coupled to the second column line.

4. The image sensor of claim 1, wherein the pixel circuit further includes a reset element electrically connected between a power supply node and the floating diffusion node, and a bias element which is configured to supply a bias current to the driving element.

5. The image sensor of claim 1, wherein the first output circuit further includes a first output driving element electrically connected between the first switching element and the first selection element; and wherein the second output circuit further includes a second output driving element electrically connected between the second switching element and the second selection element.

6. The image sensor of claim 1, further comprising:
a logic circuit configured to: (i) drive the plurality of pixels to thereby obtain image data therefrom, and (ii) simultaneously expose the plurality of pixels to light during an exposure time, obtain a reset voltage through the first column line, and obtain a pixel voltage through the second column line.

7. The image sensor of claim 6, wherein the logic circuit is configured to: (i) turn on the first enable element and the second enable element when an intensity of the light is less than a predetermined reference intensity, and (ii) turn off the first enable element and the second enable element when the intensity of the light is greater than the reference intensity.

8. The image sensor of claim 6, wherein the logic circuit is configured to: (i) obtain a predetermined reference voltage through each of the first column line and the second column line after obtaining the reset voltage and the pixel voltage, and (ii) generate the image data based on a difference between the reference voltage and the reset voltage and a difference between the reference voltage and the pixel voltage.

9. The image sensor of claim 6,
wherein the logic circuit samples a first pixel voltage corresponding to electrical charge generated by the photodiode during a first exposure time, to the first primary capacitor and the first secondary capacitor in each of the plurality of pixels, and samples a second pixel voltage corresponding to electrical charge generated by the photodiode during a second exposure time to the second primary capacitor in each of the plurality of pixels;
wherein the second exposure time is shorter than the first exposure time; and
wherein, subsequent to the first exposure time, the logic circuit generates the image data based on the first pixel voltage and the second pixel voltage.

10. The image sensor of claim 6, further comprising:
a light source configured to irradiate light onto a subject, which reflects the light to the plurality of pixels;
wherein the logic circuit is configured to: (i) store electrical charges generated by the photodiode in each of the plurality of pixels during a first exposure time at which the light source is turned on, in the first primary capacitor, (ii) store electrical charges generated by the photodiode in each of the plurality of pixels during a second exposure time in which the light source is turned off after the first exposure time, in the second primary capacitor, and (iii) generate the image data, based on a first pixel voltage corresponding to electrical charge generated by the photodiode during the first exposure time and a second pixel voltage corresponding to electrical charge generated by the photodiode during the second exposure time.

11. The image sensor of claim 10, wherein the logic circuit is configured to turn off the first enable element and the second enable element during the first exposure time and the second exposure time.

12. The image sensor of claim 1, further comprising:
a first semiconductor substrate on which the photodiode and the pixel circuit are disposed; and
a second semiconductor substrate on which the first output circuit and the second output circuit are disposed and stacked with the first semiconductor substrate.

13. An image sensor, comprising:
a pixel array having a plurality of pixels therein; and
a logic circuit configured to drive the pixel array in order to obtain image data therefrom,
wherein each of the plurality of pixels includes:
a photodiode configured to generate electrical charges in response to light;
a transfer element electrically connected between the photodiode and a floating diffusion node, which accumulates the electrical charges generated by the photodiode;
a driving element electrically connected to the floating diffusion node, said driving element configured to generate an output voltage by amplifying a voltage of the floating diffusion node;
a first output circuit electrically connected between a first column line and the driving element, said first output circuit including a first switching element, a first capacitor electrically connected to the first switching element, and a first selection element electrically connected between the first capacitor and the first column line; and
a second output circuit electrically connected between a second column line and the driving element, said second output circuit including a second switching element, a second capacitor electrically connected to the second switching element, and a second selection element electrically connected between the second capacitor and the second column line; and
wherein the logic circuit is configured to set the first capacitor to have a first capacity when an intensity of the light is a first intensity, and set the first capacitor to have a second capacity, smaller than the first capacity, when the intensity of the light is a second intensity greater than the first intensity.

14. The image sensor of claim 13, wherein when the intensity of the light is the first intensity, the logic circuit sets the second capacitor to have a third capacity, and when the intensity of the light is the second intensity, the logic circuit sets the second capacitor to have a fourth capacity smaller than the third capacity.

15. The image sensor of claim 13, wherein the first capacitor includes: a first primary capacitor, a first secondary capacitor having a capacity smaller than a capacity of the first primary capacitor, and a first enable element electrically connected between the first primary capacitor and the first secondary capacitor.

16. The image sensor of claim 13, wherein the logic circuit includes a first analog-to-digital converter electrically connected to the first column line, and a second analog-to-digital converter electrically connected to the second column line, and is configured to obtain the image data based on a difference between a first digital signal output from the first analog-to-digital converter and a second digital signal output from the second analog-to-digital converter.

17. An image sensor, comprising:
a pixel array having a plurality of pixels therein; and
a logic circuit configured to expose the plurality of pixels to light for an exposure time and obtain image data from the pixel array;
wherein each of the plurality of pixels includes: (i) a photodiode, (ii) a pixel circuit connected to the photodiode and configured to generate a reset voltage and a pixel voltage, (iii) a first output circuit including a first capacitor for storing the reset voltage, and connected between a first column line and the pixel circuit, and (iv) a second output circuit including a second capacitor for storing the pixel voltage, and connected between a second column line and the pixel circuit; and wherein the logic circuit is configured to adjust a capacity of each of the first and second capacitors based on a duration of the exposure time.

18. The image sensor of claim 17, wherein when the exposure time is longer than a predetermined reference time, the logic circuit sets a capacity of the first capacitor to be a first capacity, and when the exposure time is shorter than the predetermined reference time, the logic circuit sets the capacity of the first capacitor to be a second capacity, smaller than the first capacity.

19. The image sensor of claim 18, wherein when the exposure time is longer than the predetermined reference time, the logic circuit sets a capacity of the second capacitor to be a third capacity, and when the exposure time is shorter than the predetermined reference time, the logic circuit sets the capacity of the second capacitor to be a fourth capacity smaller than the third capacity.

20. The image sensor of claim 17, wherein during one frame period in which the logic circuit obtains the image data from the plurality of pixels, the exposure time includes a first exposure time and a second exposure time shorter than the first exposure time; and wherein the logic circuit is configured to connect the first output circuit to the pixel circuit, between the first exposure time and the second exposure time, and connect the second output circuit to the pixel circuit after the second exposure time.

\* \* \* \* \*